(12) United States Patent
Nakagawa

(10) Patent No.: US 9,684,722 B2
(45) Date of Patent: Jun. 20, 2017

(54) SERVER APPARATUS AND FILTERING METHOD

(71) Applicant: FUJITSU LIMITED, Kawasaki-shi, Kanagawa (JP)

(72) Inventor: Hiroshi Nakagawa, Kanazawa (JP)

(73) Assignee: FUJITSU LIMITED, Kawasaki (JP)

( * ) Notice: Subject to any disclaimer, the term of this patent is extended or adjusted under 35 U.S.C. 154(b) by 439 days.

(21) Appl. No.: 13/893,844

(22) Filed: May 14, 2013

(65) Prior Publication Data

US 2014/0012864 A1    Jan. 9, 2014

(30) Foreign Application Priority Data

Jul. 4, 2012    (JP) ................................. 2012-150893

(51) Int. Cl.
*G06F 7/00*     (2006.01)
*G06F 17/00*    (2006.01)
*G06F 17/30*    (2006.01)

(52) U.S. Cl.
CPC .. *G06F 17/30867* (2013.01); *G06F 17/30516* (2013.01)

(58) Field of Classification Search
CPC ......... G06F 17/30867; G06F 17/30312; G06F 17/30557; G06F 17/30713; G06F 17/30734; G06F 17/30
USPC ....... 707/102; 709/223, 224; 726/1; 455/526
See application file for complete search history.

(56) References Cited

U.S. PATENT DOCUMENTS 7,058,422 B2 *   6/2006   Learned et al. .............. 455/526
7,607,164 B2 *  10/2009   Vasishth et al. .................. 726/1
2002/0049755 A1  4/2002   Koike
2003/0177192 A1  9/2003   Umeki et al.
2005/0144000 A1  6/2005   Yamasaki et al.
2006/0058976 A1 *  3/2006   Ferris ........................... 702/123
2006/0064486 A1 *  3/2006   Baron et al. .................. 709/224
(Continued)

FOREIGN PATENT DOCUMENTS

JP    2001-337987    12/2001
JP    2002-63206     2/2002
(Continued)

OTHER PUBLICATIONS

Japanese Office Action dated Mar. 15, 2016 in corresponding Japanese Patent Application No. 2012-150893.

*Primary Examiner* — Susan Chen
(74) *Attorney, Agent, or Firm* — Staas & Halsey LLP

(57) ABSTRACT

According to one embodiment, an output unit performs filtering on input data for each filtering condition for performing data filtering and outputs a result of the filtering to an output destination. A receiving unit receives information indicating whether the output result of the filtering is appropriate or inappropriate from the output destination. A cumulative counting unit cumulatively counts the numbers of times determined to be appropriate and appropriate for each filtering condition based on the received information. A switching unit switches the filtering at the output unit between being valid and invalid for each filtering condition based on cumulative values of the numbers of times the output result of the filtering for each filtering condition has been determined to be appropriate and inappropriate and a switching condition that switches the filtering condition between being valid and invalid.

18 Claims, 20 Drawing Sheets

(56) References Cited

U.S. PATENT DOCUMENTS

| | | | |
|---|---|---|---|
| 2006/0248181 A1* | 11/2006 | Glassco et al. | 709/223 |
| 2007/0219912 A1 | 9/2007 | Takano et al. | |
| 2008/0046165 A1* | 2/2008 | Downs | G08G 1/0104 |
| | | | 701/117 |
| 2008/0046462 A1* | 2/2008 | Kaufman et al. | 707/102 |
| 2009/0259349 A1* | 10/2009 | Golenski | G08G 1/205 |
| | | | 701/2 |
| 2010/0217525 A1* | 8/2010 | King | G06Q 30/02 |
| | | | 701/300 |
| 2011/0241862 A1* | 10/2011 | Debouk | B60W 50/035 |
| | | | 340/439 |
| 2013/0204943 A1* | 8/2013 | Ricci | G06F 3/0484 |
| | | | 709/204 |
| 2014/0062712 A1* | 3/2014 | Reiter | G08B 5/22 |
| | | | 340/691.6 |

FOREIGN PATENT DOCUMENTS

| | | |
|---|---|---|
| JP | 2003-271511 | 9/2003 |
| JP | 2005-190421 | 7/2005 |
| JP | 2007-243253 | 9/2007 |
| JP | 2009-75738 | 4/2009 |
| JP | 2011-76153 | 4/2011 |

* cited by examiner

| CONDITION | FILTERING CONDITION | STATUS | INVALIDATION CONDITION |
|---|---|---|---|
| A | FORECAST OF RAIN AND 40 km/h OR LESS | VALID | VALID |
| B | FORECAST OF RAIN AND 60 km/h OR LESS | VALID | VALID |
| C | FORECAST OF RAIN AND 80 km/h OR LESS | VALID | VALID |

| CONDITION | NUMBER OF TIMES OF SUCCESS | NUMBER OF TIMES OF FAILURE |
|---|---|---|
| A | 10 | 2 |
| B | 7 | 3 |
| C | 3 | 7 |

| CONDITION | INVALIDATION CONDITION | INVALIDATION CANCELLATION CONDITION |
|---|---|---|
| A | 5 | NUMBER OF TIMES OF SUCCESS BEING 10 OR MORE |
| B | 5 | NUMBER OF TIMES OF SUCCESS BEING 10 OR MORE |
| C | 7 | NUMBER OF TIMES OF SUCCESS BEING 10 OR MORE |

| CONDITION | FILTERING CONDITION | STATUS | INVALIDATION CONDITION |
|---|---|---|---|
| A | FORECAST OF RAIN AND 40 km/h OR LESS | VALID | VALID |
| A' | FORECAST OF RAIN AND WIPERS WORKING | VALID | VALID |

| CONDITION | NUMBER OF TIMES OF INVALIDATION CONDITION | INVALIDATION CANCELLATION CONDITION | NUMBER OF TIMES OF INTEGRATION | INTEGRATION CONDITION |
|---|---|---|---|---|
| A | 5 | NUMBER OF TIMES OF SUCCESS BEING 10 OR MORE | 5 | A × A' (A AND A') |
| A' | 5 | NUMBER OF TIMES OF SUCCESS BEING 10 OR MORE | 5 | A × A' (A AND A') |

| CONDITION | NUMBER OF TIMES OF SUCCESS | NUMBER OF TIMES OF FAILURE |
|---|---|---|
| A | 3 | 5 |
| A' | 4 | 5 |
| A × A' | 10 | 3 |

| CONDITION | FILTERING CONDITION | STATUS | INVALIDATION CONDITION |
|---|---|---|---|
| A | FORECAST OF RAIN AND 40 km/h OR LESS | INVALID | VALID |
| A' | FORECAST OF RAIN AND WIPERS WORKING | INVALID | VALID |
| A × A' | FORECAST OF RAIN AND 40 km/h OR LESS AND WIPERS WORKING | VALID | VALID |

| CONDITION | NUMBER OF TIMES OF INVALIDATION CONDITION | INVALIDATION CANCELLATION CONDITION | NUMBER OF TIMES OF INTEGRATION | INTEGRATION CONDITION |
|---|---|---|---|---|
| A | 5 | NUMBER OF TIMES OF SUCCESS BEING 10 OR MORE | 5 | A × A' (A AND A') |
| A' | 5 | NUMBER OF TIMES OF SUCCESS BEING 10 OR MORE | 5 | A × A' (A AND A') |
| A × A' | 5 | NUMBER OF TIMES OF SUCCESS BEING 10 OR MORE | | |

FIG.18

| CONDITION | FILTERING CONDITION | CLIENT 25 STATUS | CLIENT 25 INVALIDATION CONDITION | CLIENT 26 STATUS | CLIENT 26 INVALIDATION CONDITION |
|---|---|---|---|---|---|
| A | FORECAST OF RAIN | INVALID | VALID | VALID | VALID |
| B | 40 km | INVALID | VALID | VALID | VALID |
| C | WIPERS WORKING | INVALID | VALID | VALID | VALID |
| A × B | FORECAST OF RAIN AND 40 km | VALID | VALID | VALID | VALID |
| A × C | FORECAST OF RAIN AND WIPERS WORKING | INVALID | VALID | VALID | VALID |
| B × C | 40 km AND WIPERS WORKING | VALID | VALID | VALID | VALID |
| A × B × C | FORECAST OF RAIN AND 40 km AND WIPERS WORKING | VALID | VALID | VALID | INVALID |

FIG.19

| CONDITION | INVALIDATION CONDITION | INVALIDATION CANCELLATION CONDITION |
|---|---|---|
| A | 5 | NUMBER OF TIMES OF SUCCESS BEING 10 OR MORE |
| B | 5 | NUMBER OF TIMES OF SUCCESS BEING 10 OR MORE |
| C | 5 | NUMBER OF TIMES OF SUCCESS BEING 10 OR MORE |
| A × B | 5 | NUMBER OF TIMES OF SUCCESS BEING 10 OR MORE |
| A × C | 5 | NUMBER OF TIMES OF SUCCESS BEING 10 OR MORE |
| B × C | 5 | NUMBER OF TIMES OF SUCCESS BEING 10 OR MORE |
| A × B × C | 5 | NUMBER OF TIMES OF SUCCESS BEING 10 OR MORE |

| CONDITION | NUMBER OF TIMES OF SUCCESS | NUMBER OF TIMES OF FAILURE |
|---|---|---|
| A × B × C | 10 | 1 |

FIG.24

| CONDITION | FILTERING CONDITION | STATUS | INVALIDATION CONDITION |
|---|---|---|---|
| A | FORECAST OF RAIN AND 40 km/h OR LESS | VALID | INVALID |
| B | FORECAST OF RAIN AND 60 km/h OR LESS | VALID | INVALID |
| C | FORECAST OF RAIN AND 80 km/h OR LESS | INVALID | VALID |

| FILTERING CONDITION | STATUS | INVALIDATION CONDITION | NUMBER OF TIMES OF SUCCESS | NUMBER OF TIMES OF FAILURE | INVALIDATION CONDITION | INVALIDATION CANCELLATION CONDITION |
|---|---|---|---|---|---|---|
| FORECAST OF RAIN AND 40 km/h OR LESS | VALID | VALID | 10 | 2 | 5 | NUMBER OF TIMES OF SUCCESS BEING 10 OR MORE |
| FORECAST OF RAIN AND 60 km/h OR LESS | VALID | VALID | 7 | 3 | 5 | NUMBER OF TIMES OF SUCCESS BEING 10 OR MORE |
| FORECAST OF RAIN AND 80 km/h OR LESS | VALID | VALID | 3 | 7 | 7 | NUMBER OF TIMES OF SUCCESS BEING 10 OR MORE |

FIG.27

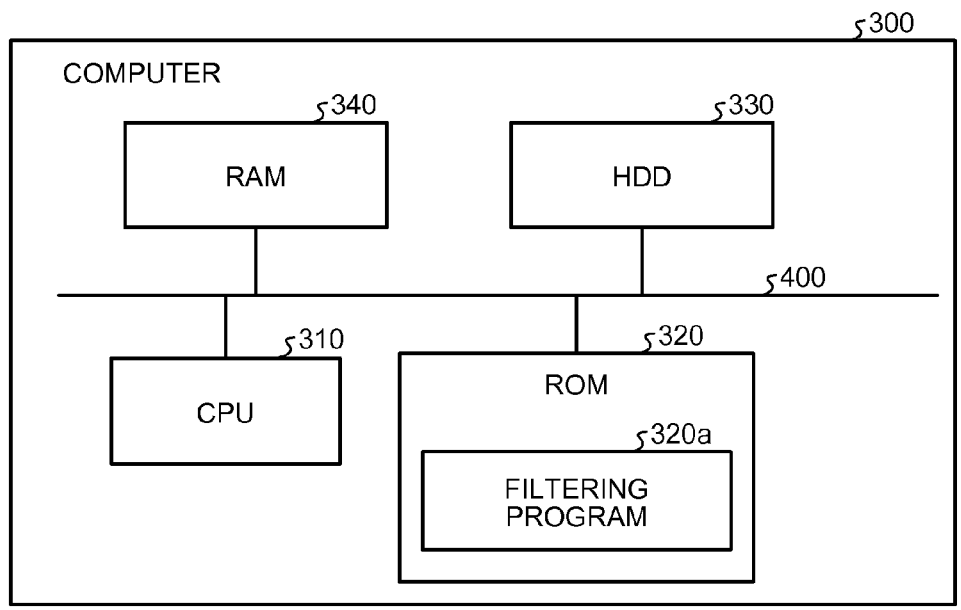

SERVER APPARATUS AND FILTERING METHOD

CROSS-REFERENCE TO RELATED APPLICATIONS

This application is based upon and claims the benefit of priority of the prior Japanese Patent Application No. 2012-150893, filed on Jul. 4, 2012, the entire contents of which are incorporated herein by reference.

FIELD

The embodiments discussed herein are related to a server apparatus, a filtering method, and a filtering program.

BACKGROUND

Complex event processing (CEP) has been recently known as a technique for processing data collected from various objects moment by moment. In the complex event processing, for example, a plurality of pieces of data received from various objects are subjected to filtering with set conditions, and a result is output to an output destination. Although the complex event processing may be referred to as the event stream processing (ESP), it will be collectively referred to as CEP including ESP in the following.

In a CEP system performing complex event processing, because an administrator manually sets filtering conditions, it may be difficult to extract effective data, depending on the skill of the administrator. For this reason, a technique is known in which the combination patterns of attribute values that frequently appear in event logs are determined to generate queries automatically (see, for example, Patent Document 1).

[Patent Document 1] Japanese Laid-open Patent Publication No. 2011-76153

[Patent Document 2] Japanese Laid-open Patent Publication No. 2005-190421

[Patent Document 3] Japanese Laid-open Patent Publication No. 2002-63206

[Patent Document 4] Japanese Laid-open Patent Publication No. 2009-75738

With the conventional technique, however, effective data for an output destination is unable to be extracted in some cases.

SUMMARY

According to an aspect of an embodiment, a server apparatus includes an output unit that performs filtering on input data for each filtering condition for performing data filtering and outputs a result of the filtering to an output destination; a receiving unit that receives information indicating whether the result of the filtering output from the output unit is appropriate or inappropriate from the output destination; a cumulative counting unit that cumulatively counts the numbers of times the output result of the filtering has been determined to be appropriate and inappropriate for each filtering condition based on the information received by the receiving unit; and a switching unit that switches the filtering at the output unit between being valid and invalid for each filtering condition based on cumulative values of the numbers of times the output result of the filtering has been determined to be appropriate and inappropriate and a switching condition that switches the filtering condition between being valid and invalid.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of the data configuration of a filtering condition table;

FIG. 5 is a diagram illustrating an example of the data configuration of a cumulative counting number table;

FIG. 10 is a diagram illustrating an example of the functional configuration of the filtering condition table;

FIG. 11 is a diagram illustrating an example of the data configuration of the switching condition table;

FIG. 12 is a diagram illustrating an example of the cumulative counting number table;

FIG. 13 is a diagram illustrating an example of the filtering condition table with a new filtering condition added;

FIG. 18 is a diagram illustrating an example of the filtering condition table;

FIG. 19 is a diagram illustrating an example of the switching condition table;

FIG. 24 is a diagram illustrating an example of the functional configuration of the filtering condition table;

FIG. 26 is a diagram illustrating an example of a data configuration when all pieces of data are stored in a single table; and FIG. 27 is a diagram illustrating a computer that executes a filtering program.

DESCRIPTION OF EMBODIMENTS

Preferred embodiments of the present invention will be explained with reference to accompanying drawings.

The present invention is not limited by the embodiments. The embodiments may be appropriately combined to the extent that no contradiction arises among the processing details.

[a] First Embodiment

Figure 1:
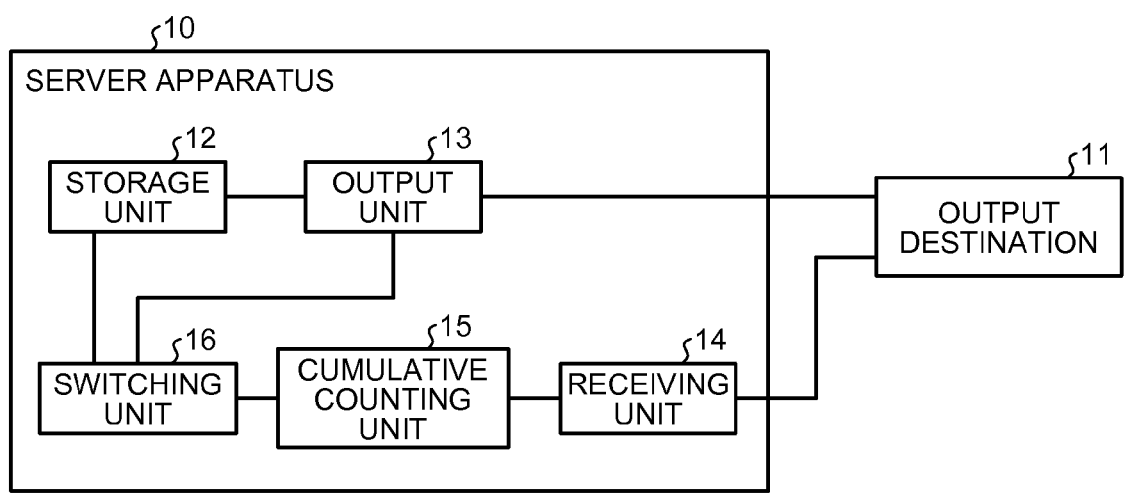
FIG. 1 is a diagram illustrating the overall configuration of a CEP system including a server apparatus according to a first embodiment of the present invention.

A server apparatus according to the first embodiment will be explained. FIG. 1 is a diagram illustrating the overall configuration of a CEP system including the server apparatus according to the first embodiment. This server apparatus 10 is a physical server that performs complex event processing and is, for example, a server computer installed in a data center or a corporation. Data collected from various objects is distributed to the server apparatus 10. The server apparatus 10 performs filtering on a plurality of types of data received from various objects with set conditions and outputs a result to an output destination 11.

As illustrated in FIG. 1, the server apparatus 10 includes a storage unit 12, an output unit 13, a receiving unit 14, a cumulative counting unit 15, and a switching unit 16.

The storage unit 12 stores therein various types of information. For example, the storage unit 12 stores therein a filtering condition under which data is subjected to filtering. The storage unit 12 also stores therein a switching condition for switching the filtering condition between being valid and invalid.

The output unit 13 outputs various types of information to the output destination 11. For example, the output unit 13 performs filtering on data input from various objects under each filtering condition stored in the storage unit 12 and outputs the result of the filtering to the output destination 11. The result of the filtering to be output may be data that matches a filter. The result of the filtering to be output may also be data that informs of a match with a filter. The result of the filtering to be output may also be data of the result of processing performed following a match with a filter.

The output destination 11 performs processing based on the result of the filtering received from the output unit 13. The output destination 11 determines whether the result of the filtering is appropriate or inappropriate. For example, when a plurality of filtering conditions under which a specific state is predicted are set in the server apparatus 10 and when a match with each of the filtering conditions is informed from the server apparatus 10, the output destination 11 determines whether the specific state has occurred when a match with any of the filtering conditions is informed. When the specific state has occurred, the output destination 11 determines the result of the filtering to be appropriate. When the specific state has not occurred, the output destination determines the result of the filtering to be inappropriate. The output destination 11 feeds back the determination result. The feedback of the determination result may be performed at evenly spaced periods such as once per day, may be performed anytime the determination is performed, or may be based on timing directed by an administrator.

The receiving unit 14 receives various types of information. For example, the receiving unit 14 receives information indicating whether the result output from the output unit 13 is appropriate or inappropriate from the output destination 11.

The cumulative counting unit 15 performs various types of cumulative counting. For example, the cumulative counting unit 15 cumulatively counts the numbers of times determined to be appropriate and appropriate for each filtering condition based on the information received by the receiving unit 14.

The switching unit 16 performs various types of switching. For example, the switching unit 16 switches the filtering conditions between being valid and invalid for each of the filtering conditions based on the cumulative values of the numbers of times determined to be appropriate and appropriate for each filtering condition and the switching condition.

The example of FIG. 1 illustrating a functional configuration, the output unit 13, the receiving unit 14, the cumulative counting unit 15, and the switching unit 16 are separated from each other. For example, they may be configured as a single device. Examples of the device include electronic circuits such as a central processing unit (CPU) and a micro processing unit (MPU). As the device, an integrated circuit such as an application specific integrated circuit (ASIC) or a field programmable gate array (FPGA) may be also employed.

In the CEP system, it may be difficult to set an appropriate filtering condition, and it may be unable to extract effective data for the output destination 11 in some cases. For example, when various partial conditions under which the occurrence of a specific state is predicted are set as the filtering conditions, data relating to the occurrence of the specific state is extracted, whereas data relating to the absence of the specific state is also extracted. When a sufficient condition that causes the specific state is set as the filtering condition, data relating to the occurrence of the specific state is extracted, whereas data relating to the occurrence of the specific state caused by other than the sufficient condition becomes unable to be extracted.

Given these circumstances, the server apparatus 10 is set with various conditions under which the occurrence of a specific state is predicted as the filtering conditions and the switching condition for switching the filtering conditions between being valid and invalid. The server apparatus 10 performs filtering on data input from various objects under each of the filtering conditions and outputs the result of the filtering to the output destination 11. The output destination 11 determines whether the result of the filtering is appropriate or inappropriate and feeds the determination result back to the server apparatus 10. The server apparatus 10 receives information indicating whether the output result is appropriate or inappropriate from the output destination 11. The server apparatus 10 cumulatively counts the numbers of times the output result is determined to be appropriate and inappropriate for each of the filtering conditions, and switches each of the filtering conditions between being valid and invalid based on the cumulative values of the numbers of times the output result is determined to be appropriate and inappropriate for each of the filtering conditions and based on the switching condition. This allows the server apparatus 10 to extract effective data for the output destination 11. The server apparatus 10 can reduce the amount of data of the result of the filtering sent to the output destination 11, because data is not extracted under inappropriate filtering conditions.

[b] Second Embodiment

Figure 2:
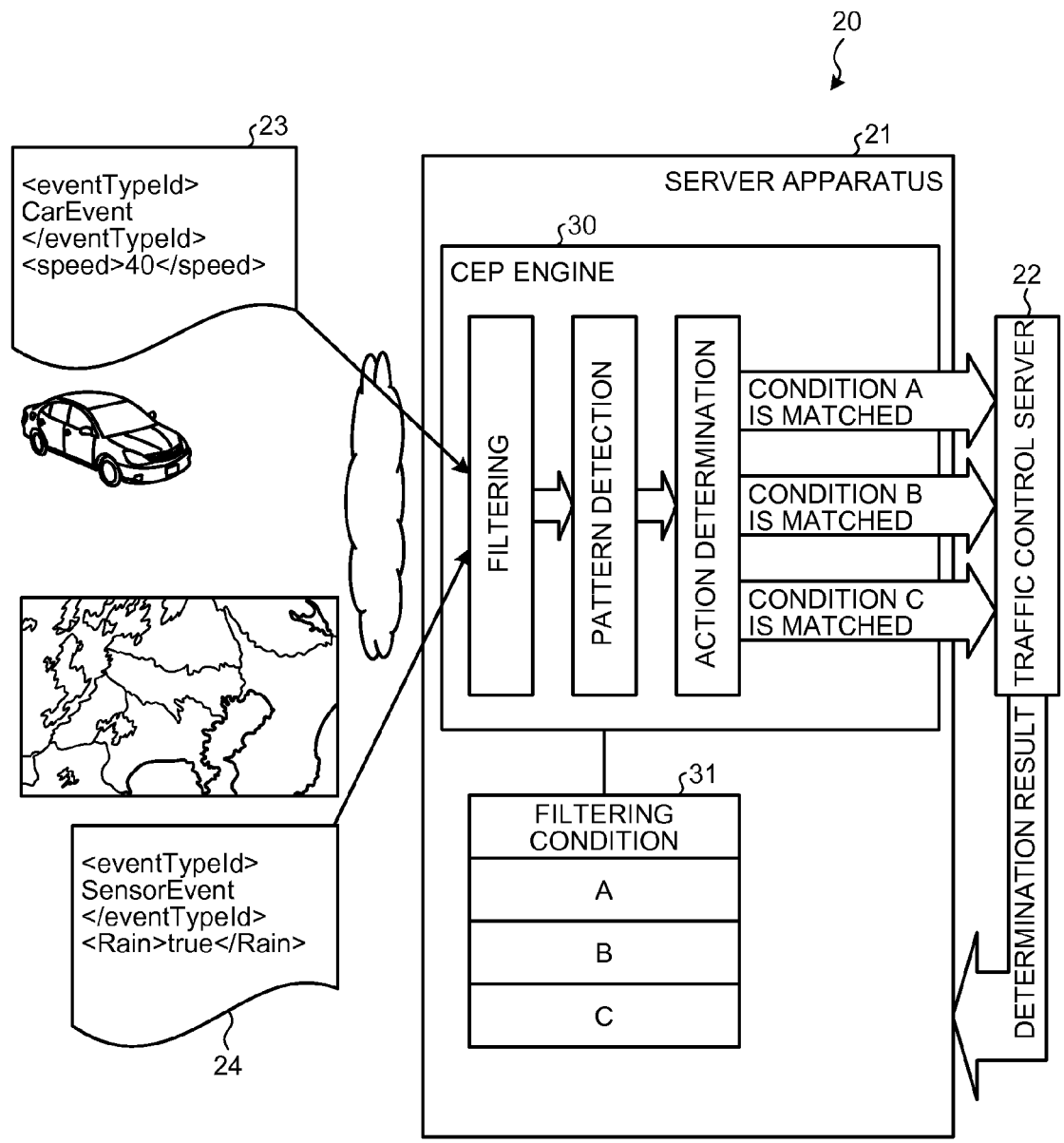
FIG. 2 is a diagram illustrating an example of the schematic configuration of a CEP system according to a second embodiment.

A second embodiment will be explained. The second embodiment describes a case in which a CEP system is applied to the prediction of road traffic congestion. FIG. 2 is a diagram illustrating an example of the schematic configuration of the CEP system according to the second embodiment. This CEP system 20 includes a server apparatus 21. The example of FIG. 2 exemplifies a case with the single server apparatus 21. The disclosed system is not limited thereto, and the two or more server apparatuses 21 may be provided to distribute processing. The example of FIG. 2 exemplifies a case in which a CEP engine 30, which will be explained later, operates on the server apparatus 21. One or more virtual machines (VM) may be operated on the server apparatus 21, and the CEP engine 30 may operate on the VM.

The server apparatus 21 is connected to a network (not illustrated) to communicate with a traffic control server 22 that performs road traffic control through the network. Data collected from various objects is distributed to the server apparatus 21. For example, speed information 23 that indicates the speed of vehicles detected by speed sensors provided at predetermined positions on a road subjected to traffic condition monitoring is distributed to the server apparatus 21. Weather information 24 that indicates predicted weather in an area including the road subjected to monitoring is distributed as appropriate from a server of a provider who provides service of providing weather forecast to the server apparatus 21.

FIG. 2 illustrates an example of the speed information 23 and the weather information 24 that are distributed. In the present embodiment, the speed information 23 and the weather information 24 have a data structure of the extensible markup language (XML) type.

The speed information 23 illustrated in FIG. 2 has items with data names of "eventTypeID" and "speed" as tags. The "eventTypeID" is a tag used for embedding the type of an event that has occurred. In the speed information 23, "CarEvent" indicating that a vehicle has passed is embedded in the tag "eventTypeID" as the type of an event that has occurred. The "speed" is a tag used for embedding a detected speed. In the speed information 23, a value indicating speed per hour ([Km/h]) is embedded in the tag "speed" as a detected speed of the vehicle. The speed information 23 in the example of FIG. 2 indicates that the speed of the vehicle is 40 [Km/h].

The weather information 24 illustrated in FIG. 2 has items with data names of "eventTypeId" and "Rain" as tags. The "eventTypeId" is, as explained above, a tag used for embedding the type of an event that has occurred. In the weather information 24, "SensorEvent" is embedded in the tag "eventTypeId" as the type of an event that has occurred. The "Rain" is a tag used when rain is predicted. In the weather information 24, "true" is embedded in the tag "Rain" when rain is predicted. The weather information 24 in the example of FIG. 2 indicates that rain is predicted.

In the server apparatus 21, the CEP engine 30 operates. The CEP engine 30 is software that implements complex event processing. Software that implements complex event processing includes, for example, the Esper.

The server apparatus 21 stores therein filtering conditions 31. In the example of FIG. 2, the conditions A, B, and C are stored therein.

The server apparatus 21 receives the speed information 23 and the weather information 24 that have been distributed. Based on the conditions A, B, and C as the filtering conditions 31, the CEP engine 30 performs filtering on the received speed information 23 and the weather information 24 to perform pattern detection about whether there is any match with any of the conditions A, B, and C, thereby informing the traffic control server 22 of the match when there is any match with any of the conditions. The traffic control server 22 is an example of the output destination 11. The example of FIG. 2 illustrates a case in which the CEP engine 30 informs matches with the conditions A, B, and C.

When receiving information from the server apparatus 21, the traffic control server 22, with prediction of the occurrence of congestion in the road subjected to traffic condition monitoring, performs control to relieve the congestion. For example, the traffic control server 22 performs control on traffic signals provided on the road subjected to monitoring, to increase the period of a green traffic signal on the road on which the occurrence of congestion is predicted, thereby increasing the number of vehicles that can travel the road subjected to monitoring. For example, the traffic control server 22 reports traffic information that the occurrence of congestion is predicted on the road subjected to monitoring, and prompts detouring to other roads.

The traffic control server 22 determines whether the result of the filtering informed from the server apparatus 21 is appropriate or inappropriate based on whether congestion has occurred on the road subjected to monitoring. The traffic control server 22 determines that the result of the filtering is appropriate when congestion has occurred in the road subjected to monitoring. The traffic control server 22 determines that the result of the filtering is inappropriate when congestion has not occurred in the road subjected to monitoring. Whether the road subjected to monitoring has been congested may be detected using information from beacons or the like installed on the road subjected to monitoring. Whether the road subjected to monitoring has been congested may be registered from an input unit (not illustrated) of the traffic control server 22 or a terminal device such as a client computer that can communicate with the traffic control server 22.

The traffic control server 22 informs the server apparatus 21 of the determination result about whether the result of the filtering is appropriate or inappropriate.

Based on the determination result informed from the traffic control server 22, the server apparatus 21 cumulatively counts the numbers of times determined to be appropriate and inappropriate for each of the filtering conditions and switches the filtering by the CEP engine 30 between being valid and invalid.

Figure 3:
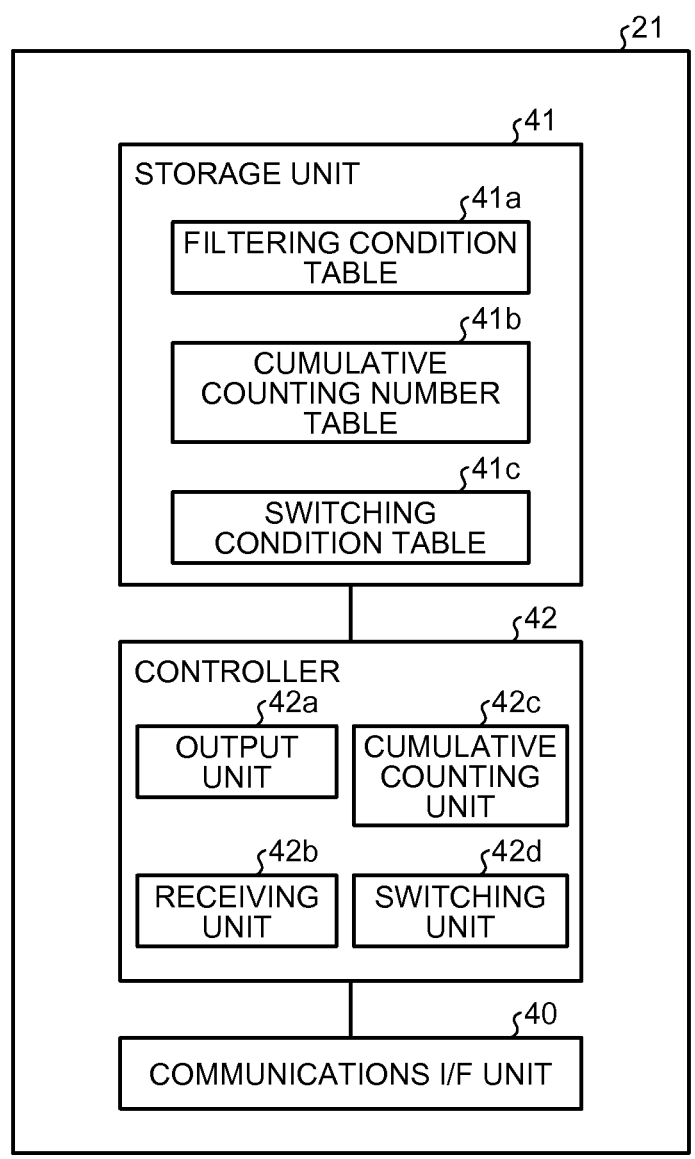
FIG. 3 is a diagram illustrating an example of the functional configuration of a server apparatus according to the second embodiment.

Next, referring to FIG. 3, a more detailed configuration of the server apparatus 21 will be explained. FIG. 3 is a diagram illustrating an example of the functional configuration of the server apparatus according to the second embodiment. As illustrated in FIG. 3, the server apparatus 21 includes a communications I/F (interface) unit 40, a storage unit 41, and a controller 42.

The communications I/F unit 40 is an interface that includes at least one port to control communications with the network. The communications I/F unit 40 receives data distributed from various objects through the network. For example, the communications I/F unit 40 receives the speed information 23 and the weather information 24. The communications I/F unit 40 transmits and receives various types of information to and from the traffic control server 22. For example, when there is a match with a filtering condition, the communications I/F unit 40 transmits information on the match with the filtering condition to the traffic control server 22. The communications I/F unit 40 receives the determination result about whether the result of the filtering is appropriate or inappropriate from the traffic control server 22.

The storage unit 41 is a storage device such as a hard disk drive or an optical disk. The storage unit 41 may be a data-rewritable semiconductor memory such as a random access memory (RAM), a read only memory (ROM), a flash memory, or a nonvolatile static random access memory (NVSARM).

The storage unit 41 stores therein various types of information. For example, the storage unit 41 stores therein an operating system (OS) and programs that execute various types of processing such as filtering processing and switching processing, which will be explained later, that are executed on the controller 42. The storage unit 41 stores therein various types of data which are needed for the controller 42 to execute programs. For example, the storage unit 41 stores therein a filtering condition table 41a, a cumulative counting number table 41b, and a switching condition table 41c.

The filtering condition table 41a is a table that stores therein filtering conditions. As an example, various conditions under which the occurrence of congestion is predicted are stored in the filtering condition table 41a by the administrator in order to perform analysis under a large number of conditions for the occurrence of congestion. As another example, the filtering condition table 41a is referred to by an output unit 42a, which will be explained later, in order to perform filtering on input data. As another example, data in the filtering condition table 41a is updated by a switching unit 42d, which will be explained later, in order to switch the filtering conditions between being valid and invalid.

FIG. 4 is a diagram illustrating an example of the data configuration of the filtering condition table. As illustrated in FIG. 4, the filtering condition table 41a includes items such as condition, filtering condition, status, and invalidation condition. The item "condition" is a field that stores therein identification information that identifies a filtering condition. The item "condition" stores therein identification information that identifies a filtering condition uniquely with numbers, characters, or the like. The item "filtering condition" is a field that stores therein filtering conditions for data filtering. The item "status" is a field that stores therein information indicating whether a filtering condition is valid or invalid. In the item "status", "invalid" is stored when the filtering condition is invalid, and "valid" is stored when the filtering condition is valid. The item "invalidation condition" is a field that stores therein information indicating whether an invalidation condition is valid or invalid. In the item "invalidation condition", "invalid" is stored when the invalidation condition is invalid, and "valid" is stored when the invalidation condition is valid. The example of FIG. 4 illustrates that the condition A includes the filtering condition being a forecast of rain and 40 [Km/h] or less, the filtering condition being valid, and the invalidation condition being valid. The condition B includes the filtering condition being a forecast of rain and 60 [Km/h] or less, the filtering condition being valid, and the invalidation condition being valid. The condition C includes the filtering condition being a forecast of rain and 80 [Km/h] or less, the filtering condition being valid, and the invalidation condition being valid.

The cumulative counting number table 41b is a table that cumulatively counts and stores therein the numbers of times the result of filtering is determined to be appropriate and inappropriate by the traffic control server 22 for each filtering condition. As an example, the cumulative counting number table 41b is referred to by the switching unit 42d, which will be explained later, in order to determine whether a filtering condition is valid. As another example, data in the cumulative counting number table 41b is updated by a cumulative counting unit 42c, which will be explained later, in order to cumulatively count the numbers of times the result of filtering has been determined to be appropriate and inappropriate for each filtering condition.

FIG. 5 is a diagram illustrating an example of the data configuration of a cumulative counting number table. As illustrated in FIG. 5, the cumulative counting number table 41b includes items such as condition, the number of times of success, and the number of times of failure. The item "condition" is a field that stores therein the identification information of the corresponding filtering condition in the filtering condition table 41a. The item "the number of times of success" is a field that cumulatively counts and stores therein the number of times the filtering condition is determined to be appropriate by the traffic control server 22. The item "the number of times of failure" is a field that cumulatively counts and stores therein the number of times the filtering condition is determined to be inappropriate by the traffic control server 22. The example of FIG. 5 illustrates that the condition A includes the number of times of success being 10 and the number of times of failure being 2. The condition B includes the number of times of success being 7 and the number of times of failure being 3. The condition C includes the number of times of success being 3 and the number of times of failure being 7.

The switching condition table 41c is a table that stores therein, for each filtering condition, an invalidation condition for invalidating a filtering condition and an invalidation cancellation condition for cancelling the invalidation condition. As an example, the switching condition table 41c is referred to by the switching unit 42d, which will be explained later, in order to determine whether a filtering condition is valid.

Figures 6, 7:
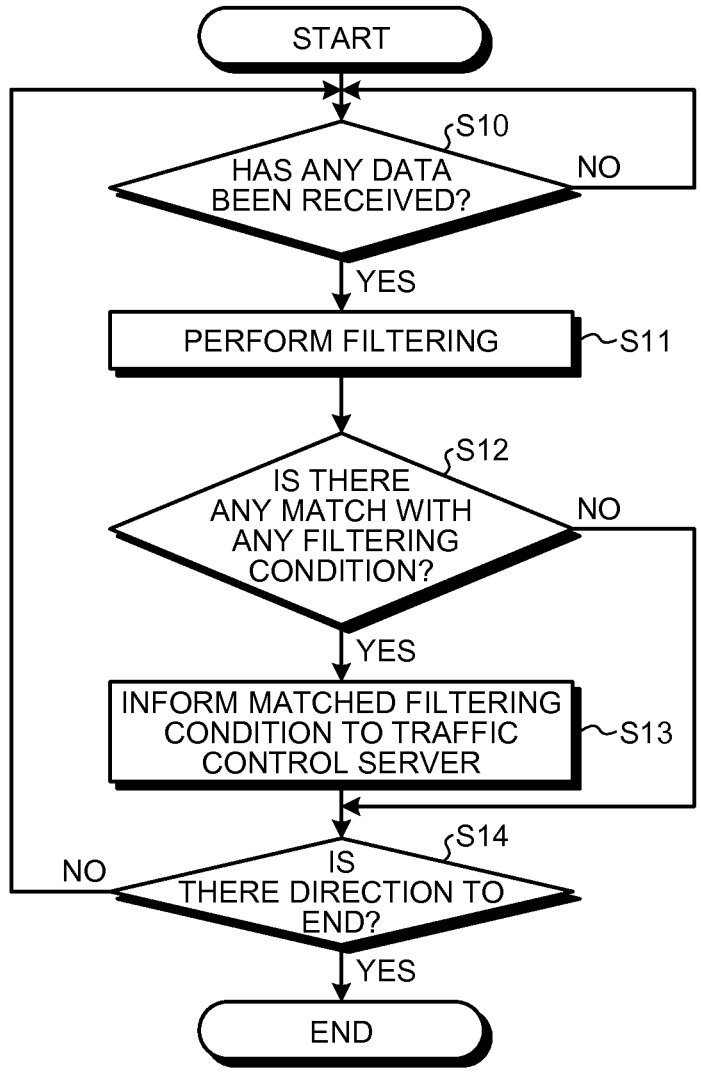
FIG. 6 is a diagram illustrating an example of the data configuration of a switching condition table.
FIG. 7 is a flowchart illustrating the procedure of filtering processing.

FIG. 6 is a diagram illustrating an example of the data configuration of a switching condition table. As illustrated in FIG. 6, the switching condition table 41c includes items such as condition, invalidation condition, and invalidation cancellation condition. The item "condition" is a field that stores therein the identification information of the corresponding filtering condition in the filtering condition table 41a. The item "invalidation condition" is a field that stores therein the value of the number of times of failure at which a filtering condition is invalidated. The item "invalidation cancellation condition" is a field that stores therein the value of the number of times of success at which an invalidation condition is cancelled. The example of FIG. 6 illustrates that the conditions A and B include the invalidation condition being 5 and the invalidation cancellation condition being such that the number of times of success is 10 or more. The condition C includes the invalidation condition being 7 and the invalidation cancellation condition being such that the number of times of success is 10 or more.

Referring back to FIG. 3, the controller 42 includes a built-in memory for storing therein programs that prescribe various processing procedures and control data, with which various types of processing are performed. The controller 42 includes, as illustrated in FIG. 3, an output unit 42*a*, a receiving unit 42*b*, the cumulative counting unit 42*c*, and the switching unit 42*d*.

The output unit 42*a* is a processing unit that performs complex event processing. The output unit 42*a*, for example, corresponds to the above CEP engine 30. When the speed information 23 or the weather information 24 is received, the output unit 42*a* performs filtering on the input data under each filtering condition whose status stored in the filtering condition table 41*a* is valid. When the input data matches any of the filtering conditions, the output unit 42*a* informs the traffic control server 22 of which filtering condition is matched.

The receiving unit 42*b* is a processing unit that receives various types of information from the traffic control server 22. The receiving unit 42*b* receives the determination result about whether the result of the filtering is appropriate or inappropriate from the traffic control server 22.

The cumulative counting unit 42*c* is a processing unit that cumulatively counts the numbers of times determined to be appropriate and inappropriate for each filtering condition. For each filtering condition whose invalidation condition stored in the filtering condition table 41*a* is valid, based on the determination result received by the receiving unit 42*b*, the cumulative counting unit 42*c* adds the numbers of times determined to be appropriate and inappropriate to the number of times of success and the number of times of failure in the cumulative counting number table 41*b*. Thus, for each filtering condition whose invalidation condition is valid, the numbers of times determined to be appropriate and inappropriate are cumulatively counted as the number of times of success and the number of times of failure to be stored in the cumulative counting number table 41*b*. For each filtering condition whose invalidation condition is invalid, the number of times of success and the number of times of failure in the cumulative counting number table 41*b* are not updated.

The switching unit 42*d* is a processing unit that switches each filtering condition between being valid and invalid. For each filtering condition whose invalidation condition is valid, the switching unit 42*d* determines whether the number of times of failure in the cumulative counting number table 41*b* matches the number of times specified as the invalidation condition in the switching condition table 41*c*. For any filtering condition whose number of times of failure matches the number of times specified as the invalidation condition, the switching unit 42*d* updates the item "status" in the filtering condition table 41*a* to be "invalid" to invalidate the filtering condition. The filtering condition whose status has become invalid thereby becomes not to be used in the filtering at the output unit 42*a*, and the traffic control server 22 becomes not to be informed under the filtering condition whose status has become invalid. In other words, in the server apparatus 21, when the number of times the result of filtering is determined to be inappropriate by the traffic control server 22 matches the invalidation condition, the status of the filtering condition becomes invalidated. The server apparatus 21 thereby does not perform filtering under a filtering condition that extracts data inappropriate for the traffic control server 22, allowing effective data to be extracted for the traffic control server 22.

For each filtering condition whose invalidation condition is valid, the switching unit 42*d* determines whether the number of times of success in the cumulative counting number table 41*b* matches the number of times specified as the invalidation cancellation condition in the switching condition table 41*c*. For a filtering condition whose number of times of success matches the number of times of the invalidation cancellation condition, the switching unit 42*d* updates the item "invalidation condition" in the filtering condition table 41*a* to be "invalid" and cancels the invalidation condition. For the filtering condition whose invalidation condition has been invalid, thus, its number of times of success and number of times of failure in the cumulative counting number table 41*b* become not to be updated, thereby allowing the number of times failure not to reach the invalidation condition, and the filtering condition is maintained to be valid.

Next, explained will be the flow of filtering processing by which the server apparatus 21 according to the present embodiment performs data filtering. FIG. 7 is a flowchart illustrating the procedure of the filtering processing. This filtering processing is performed, for example, when the server apparatus 21 is directed to start data filtering.

As illustrated in FIG. 7, the output unit 42*a* determines whether the speed information 23 or the weather information 24 has been received (S10). When the speed information 23 or the weather information 24 has not been received (No at S10), the flow moves to S10 to wait for data reception. When the speed information 23 or the weather information 24 has been received (Yes at S10), the output unit 42*a* performs filtering on the input data under each filtering condition whose status in the filtering condition table 41*a* is valid (S11). The output unit 42*a* determines whether there is a match with a filtering condition as a result of the filtering (S12). When there is a match with a filtering condition (Yes at S12), the output unit 42*a* informs the traffic control server 22 of which filtering condition is matched (S13). When any filtering condition is not matched (No at S12), the flow moves to S14, which will be explained later.

The output unit 42*a* determines whether the end of processing has been directed from a processing unit (not illustrated) that controls complex event processing (S14). When the end of processing has been directed (Yes at S14), the output unit 42*a* ends the processing. When the end of processing has not been directed (No at S14), the flow moves to S10.

Figure 8:
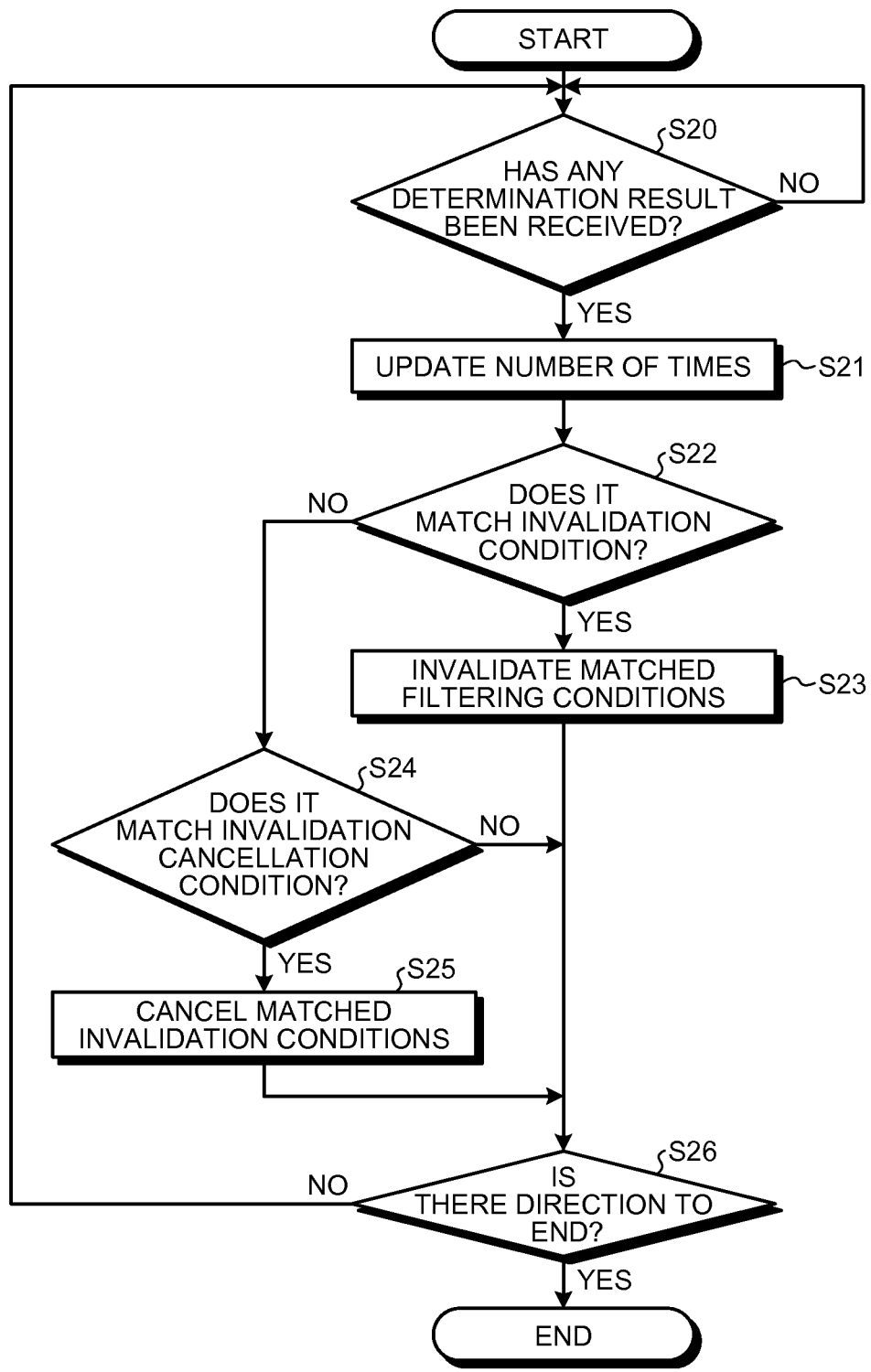
FIG. 8 is a flowchart illustrating the procedure of switching processing.

Next, explained will be the flow of switching processing by which the server apparatus 21 according to the present embodiment switches a filtering condition between being valid and invalid. FIG. 8 is a flowchart illustrating the procedure of the switching processing. This switching processing is performed, for example, when the server apparatus 21 is directed to start data filtering.

As illustrated in FIG. 8, the receiving unit 42*b* determines whether the determination result about whether the result of filtering is appropriate or inappropriate has been received from the traffic control server 22 (S20). When the determination result has not been received (No at S20), the flow moves to S20 to wait for the reception of any determination result. When he determination result has been received (Yes at S20), for each filtering condition whose invalidation condition in the filtering condition table 41*a* is valid, the cumulative counting unit 42*c* adds the numbers of times determined to be appropriate and inappropriate to the number of times of success and the number of times of failure in the cumulative counting number table 41*b* (S21).

For each filtering condition whose invalidation condition is valid, the switching unit 42*d* determines whether the number of times of failure in the cumulative counting number table 41*b* matches the number of times specified as the invalidation condition in the switching condition table 41*c* (S22). When there is a filtering condition whose number of times of failure matches the number of times specified as the invalidation condition (Yes at S22), the switching unit 42d updates the status of the filtering condition whose number of times of failure matches the number of times specified as the invalidation condition to be invalid (S23), and then the flow moves to S26, which will be explained later.

When there is no filtering condition whose number of times of failure matches the number of times specified as the invalidation condition (No at S22), for each filter whose invalidation condition is valid, the switching unit 42d determines whether the number of times of success in the cumulative counting number table 41b matches the invalidation cancellation condition in the switching condition table 41c (S24). When there is a filtering condition whose number of times of success matches the invalidation cancellation condition (Yes at S24), the switching unit 42d updates the invalidation condition of the filtering condition whose number of times of success matches the invalidation cancellation condition to be invalid (S25), and then the flow moves to S26, which will be explained later. When there is no filtering condition whose number of times of success matches the invalidation cancellation condition (No at S24), the flow moves to S26, which will be explained later.

The switching unit 42d determines whether the end of processing has been directed from a processing unit (not illustrated) that controls complex event processing (S26). When the end of processing has been directed (Yes at S26), the switching unit 42d ends the processing. When the end of processing has not been directed (No at S24), the flow moves to S20.

As described above, the server apparatus 21 stores therein the filtering conditions for data filtering and the switching conditions for switching the filtering conditions between being valid and invalid. The server apparatus 21 performs filtering on input data under each filtering condition and outputs the result of the filtering to the traffic control server 22. The server apparatus 21 receives information indicating whether the output result is appropriate or inappropriate from the traffic control server 22. Based on the received information, the traffic control server 22 cumulatively counts the numbers of times the output result is determined to be appropriate and inappropriate for each filtering condition. Based on the cumulative values of the numbers of times the output result is determined to be appropriate and inappropriate and the switching conditions, the traffic control server 22 switches the filtering between being valid and invalid for each filtering condition. This allows the server apparatus 21 to extract effective data for the traffic control server 22. The server apparatus 21 reduces the amount of data of the result of the filtering to be sent to the traffic control server 22, because data is not extracted under inappropriate filtering conditions.

The server apparatus 21 stores therein, as a switching condition, an invalidation condition for invalidating a filtering condition and a cancellation condition for cancelling the invalidation condition. The server apparatus 21 invalidates the filtering condition when the invalidation condition has been reached earlier than the cancellation condition, and cancels the invalidation condition when the cancellation condition has been reached earlier than the invalidation condition. This allows the server apparatus 21 to switch between an effective filtering condition that allows effective data to be extracted for the traffic control server 22 and an ineffective filtering condition that makes it difficult to extract effective data.

[c] Third Embodiment

A third embodiment will be explained. Because the configuration of a CEP system according to the third embodiment is nearly the same as the above second embodiment, different parts will be mainly explained.

Figure 9:
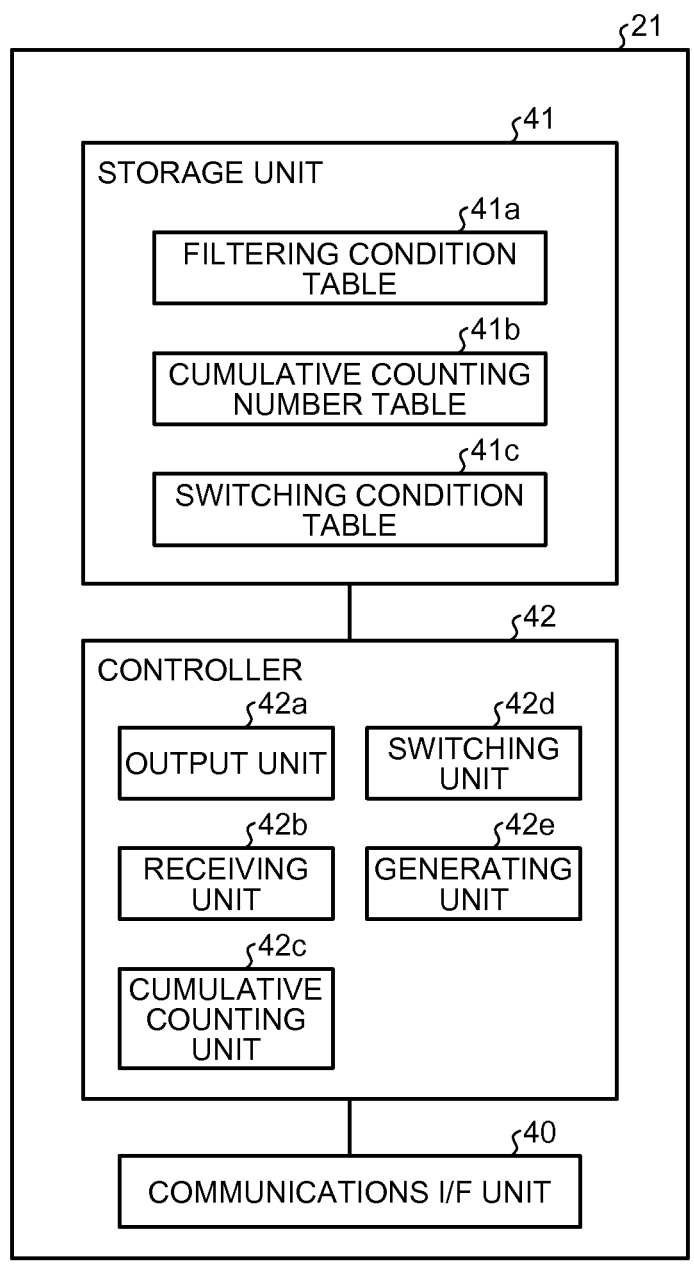
FIG. 9 is a diagram illustrating an example of the functional configuration of a server apparatus according to a third embodiment.

FIG. 9 is a diagram illustrating an example of the functional configuration of a server apparatus according to the third embodiment. This server apparatus 21 receives, in addition to information on weather forecast and vehicular speed, wiper information on whether vehicular wipers are working. The controller 42 further includes a generating unit 42e.

FIG. 10 is a diagram illustrating an example of the functional configuration of the filtering condition table. As illustrated in FIG. 10, the filtering condition table 41a stores therein a filtering condition in which conditions relating to pieces of data of different attributes are combined. The example of FIG. 10 illustrates that the condition A includes the filtering condition being a forecast of rain and 40 [Km/h] or less, the filtering condition being valid, and the invalidation condition also being valid. The filtering condition A' includes the filtering condition being a forecast of rain and the vehicular wipers working, the filtering condition being valid, and the invalidation condition also being valid.

FIG. 11 is a diagram illustrating an example of the data configuration of the switching condition table. As illustrated in FIG. 11, the switching condition table 41c further includes items such as the number of times of integration and integration condition. The item "the number of times of integration" is a field that stores therein the value of the number of times of failure at which filtering conditions are integrated. The item "integration condition" is a field that stores therein filtering conditions to be combined. The example of FIG. 11 illustrates that the conditions A and A' include the invalidation condition being 5, the invalidation cancellation condition being such that the number of times of success is 10 or more, the number of times of integration being 5, and the integration condition being a combination of the condition A and the condition A' under a condition of a logical product.

Referring back to FIG. 9, the generating unit 42e is a processing unit that performs the integration of filtering conditions. For each combination of filtering conditions between which integration under an integration condition has been designated, the generating unit 42e determines whether each of the filtering conditions matches the integration condition. When there is a combination in which each of the filtering conditions matches the integration condition, the generating unit 42e integrates the filtering conditions of the combination that matches the integration condition under the integration condition. For example, a case is assumed in which the conditions A and A' are the integration conditions illustrated in FIG. 11 and the cumulative values of the number of times the filtering conditions of the conditions A and A' have been determined to be inappropriate are the values illustrated in FIG. 12. FIG. 12 is a diagram illustrating an example of the cumulative counting number table. In this case, because the number of times of failure matches the integration condition for both the conditions A and A', the generating unit 42e generates a new filtering condition A×A' that is the logical product (AND) of the condition A and the condition A', and adds it to the filtering condition table 41a. FIG. 13 is a diagram illustrating an example of the filtering condition table with the new filtering condition added. In the filtering condition table 41a illustrated in FIG. 13, the condition A×A' is newly added to the filtering condition table 41a illustrated in FIG. 10. In the filtering condition table 41a illustrated in FIG. 13, because the numbers of times of failure of the conditions A and A' match the numbers of times specified as the invalidation condition, the statuses of the conditions A and A' are updated to be invalid.

Figure 14:
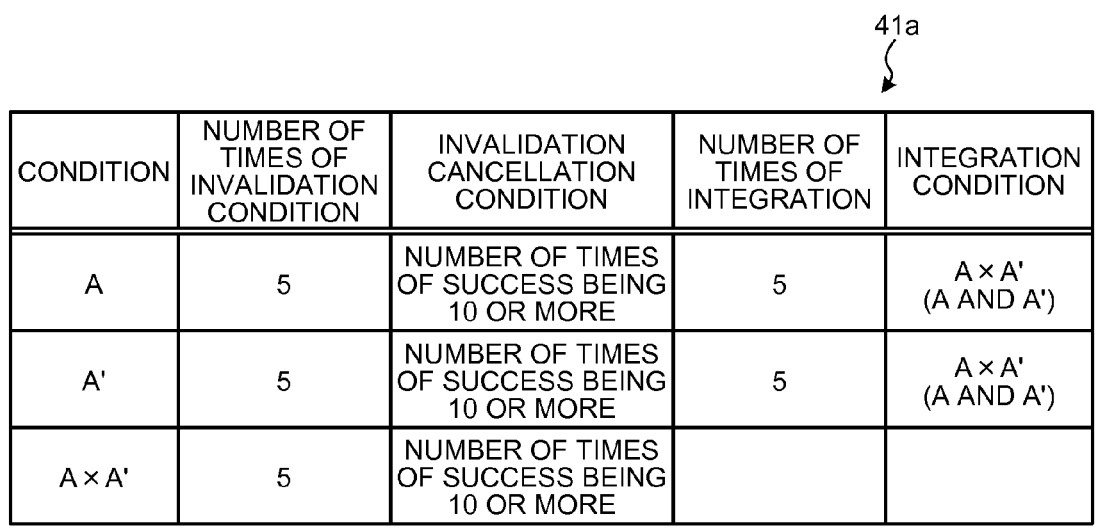
FIG. 14 is a diagram illustrating an example of the switching condition table with a switching condition for a new filtering condition added.

The generating unit 42e also generates a new switching condition for switching the new filtering condition A×A' between being valid and invalid, and adds it to the switching condition table 41c. For example, for the new filtering condition, the generating unit 42e adds a new switching condition in which the invalidation condition and the invalidation cancellation condition are set to predetermined values to the switching condition table 41c. In the present embodiment, for the new filtering condition, the generating unit 42e adds the invalidation condition being 5 and the invalidation cancellation condition being such that the number of times of success is 10 or more to the switching condition table 41c as the new switching condition. The generating unit 42e may generate a switching condition of the new filtering condition from the switching conditions of the original filtering conditions before integration. For example, the generating unit 42e may set the invalidation condition and invalidation cancellation condition of the new filtering condition to be the maximum value, minimum value, or average value of the invalidation conditions and invalidation cancellation conditions of the original filtering conditions before integration. The generating unit 42e may set the invalidation condition to be none for the integrated condition. FIG. 14 is a diagram illustrating an example of the switching condition table with a switching condition for a new filtering condition added. In the switching condition table 41c illustrated in FIG. 14, the switching condition of the condition A×A' is newly added to the switching condition table 41c illustrated in FIG. 11.

The output unit 42a performs filtering on input data under each filtering condition whose status in the filtering condition table 41a is valid. Filtering is then performed on the input data under the condition A×A'. When the input data matches any of the filtering conditions, the output unit 42a informs the traffic control server 22 of which filtering condition is matched. When the input data matches the condition A×A', thus, the match with the condition A×A' is informed to the traffic control server 22.

When informed from the server apparatus 21, the traffic control server 22 performs control to relieve congestion in a road subjected to monitoring. The traffic control server 22 determines whether the result of the filtering informed from the server apparatus 21 is appropriate or inappropriate based on whether congestion has occurred in the road subjected to monitoring. The traffic control server 22 informs the server apparatus 21 of the determination result about whether the result of the filtering is appropriate or inappropriate.

The receiving unit 42b receives the determination result about whether the result of the filtering is appropriate or inappropriate from the traffic control server 22. Based on the determination result received by the receiving unit 42b, for each filtering condition whose invalidation condition is valid, the cumulative counting unit 42c adds the numbers of times determined to be appropriate and inappropriate to the number of times of success and the number of times of failure in the cumulative counting number table 41b. In the example illustrated in FIG. 12, the number of times of success and the number of times of failure are cumulatively counted and stored also for the condition A×A'.

For each filtering condition whose invalidation condition is valid, when the number of times of success matches the number of times specified as the invalidation cancellation condition, the switching unit 42d updates the item "invalidation condition" in the filtering condition table 41a to be "invalid", and cancels the invalidation condition. For each filtering condition whose invalidation condition is valid, when the number of times of failure matches the number of times specified as the invalidation condition, the switching unit 42d updates the item "status" in the filtering condition table 41a to be "invalid", and invalidates the filtering condition. For example, when the invalidation condition and the invalidation cancellation condition of the condition A×A' are the values illustrated in FIG. 14, and when the number of times of success and the number of times of failure are the values illustrated in FIG. 12, the switching unit 42d cancels the invalidation condition of the condition A×A', because the number of times of success matches the invalidation cancellation condition. This allows the server apparatus 21 to perform filtering under the condition A×A' continuously and extract effective data for the traffic control server 22.

Figure 15:
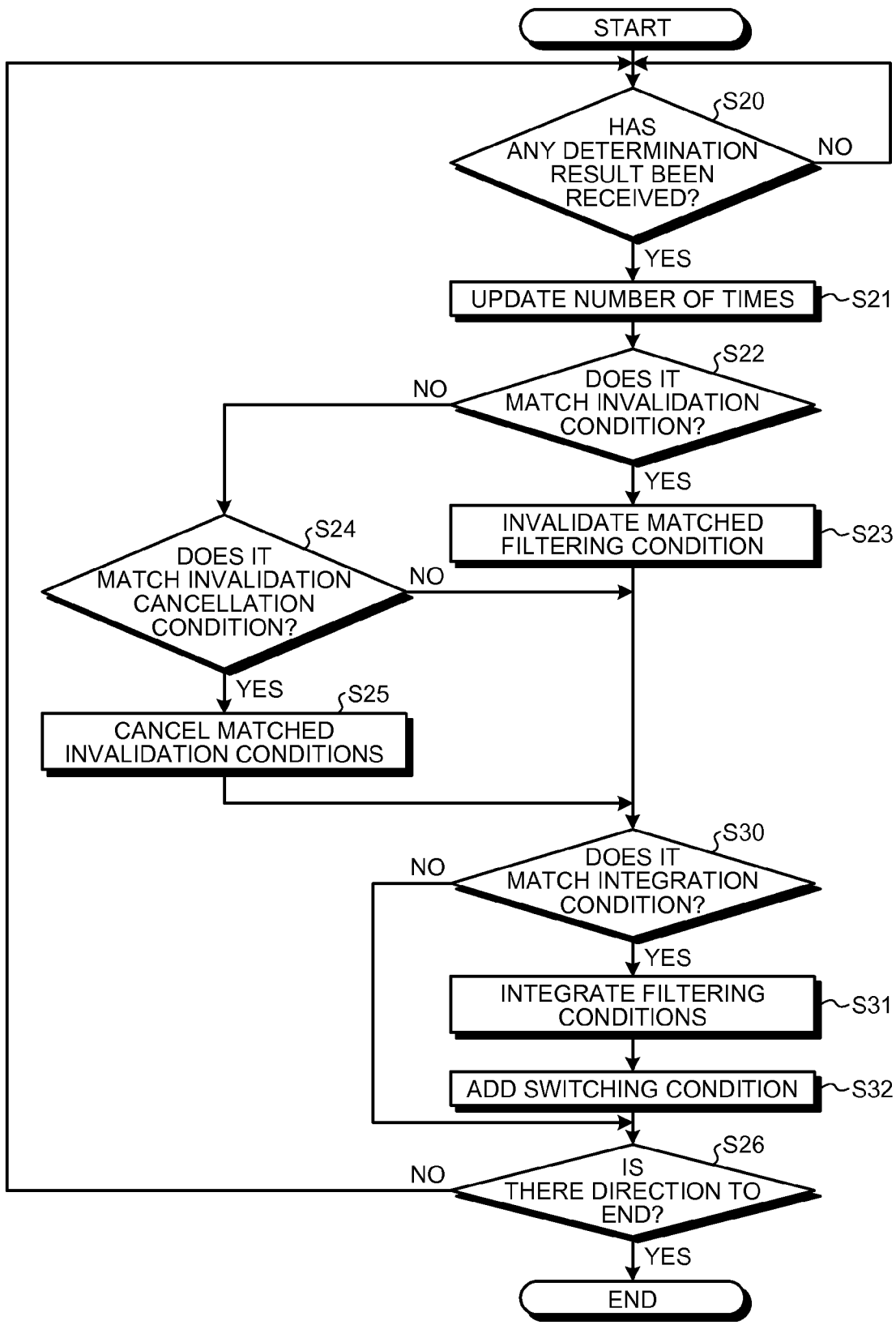
FIG. 15 is a flowchart illustrating the procedure of the switching processing.

Next, the flow of switching processing according to the present embodiment will be explained. FIG. 15 is a flowchart illustrating the procedure of the switching process. The same processing part as the switching processing according to the second embodiment illustrated in FIG. 8 will be referred to by the same reference numerals and the explanation thereof will be omitted.

As illustrated in FIG. 15, for each combination of filtering conditions between which integration under an integration condition is designated, the switching unit 42d determines whether each of the filtering conditions matches the integration condition (S30). When there is a combination in which each of the filtering conditions matches the integration condition (Yes at S30), the switching unit 42d integrates, under the integration condition, the filtering conditions of the combination that matches the integration condition, and adds the new filtering condition to the filtering condition table 41a (S31). The switching unit 42d generates a new switching condition for the new filtering condition and adds it to the switching condition table 41c (S32). Then, the flow moves to S26. When there is no combination of filtering conditions that matches the integration condition (No at S30), the flow moves to S26.

As described above, the server apparatus 21 generate a new filtering condition from a plurality of filtering conditions. This allows, even when various filtering conditions, under each of which alone it is difficult to extract effective data, are set, the server apparatus 21 to extract effective data for the traffic control server 22 by generating a new filtering condition from a plurality of filtering conditions.

[d] Fourth Embodiment

A fourth embodiment will be explained. Because the configuration of a CEP system according to the fourth embodiment is nearly the same as those of the above second and third embodiments, different parts will be mainly explained.

Figure 16:
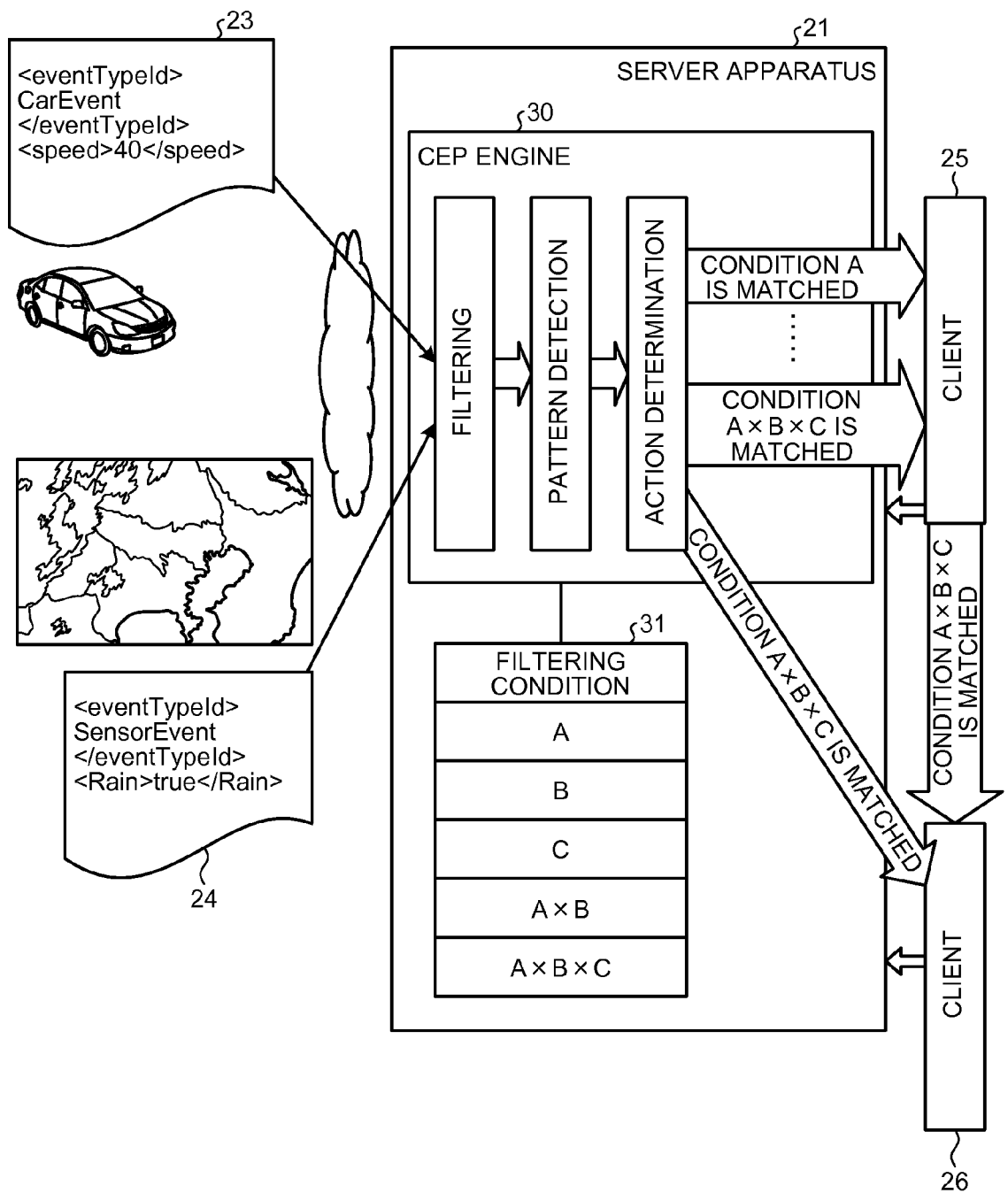
FIG. 16 is a diagram illustrating an example of the schematic configuration of a CEP system according to a fourth embodiment.

FIG. 16 is a diagram illustrating an example of the schematic configuration of the CEP system according to the fourth embodiment. The same processing part as the CEP system according to the second embodiment illustrated in FIG. 2 will be referred to by the same reference numerals and the explanation thereof will be omitted.

Data collected from various objects is distributed to the server apparatus 21. For example, the speed information 23 and the weather information 24 are distributed to the server apparatus 21. When data different from data previously input is input, the server apparatus 21 generates a new filtering condition that makes the different data subjected to filtering. For example, when the weather information 24 indicating weather that has never been received or the speed information indicating a speed that has never been received is received, the server apparatus 21 generates a new filtering condition that makes the weather or speed that has never been received a filtering condition.

Based on the filtering condition 31, the CEP engine 30 of the server apparatus 21 performs filtering about whether the received speed information 23 or the weather information 24 matches any of the filtering conditions, and when it matches any of them, the match with the filtering condition is informed to a client 25. The client 25 is, for example, the traffic control server 22. When informed from the server apparatus 21, the client 25 performs processing according to the information. For example, the traffic control server 22 performs control to relieve congestion. The client 25 can communicate with a client 26. The client 25 transfers at least part of the information from the server apparatus 21 to the client 26. For example, the client 25 transfers information under a filtering condition estimated to be effective for the client 26 to the client 26. The example of FIG. 16 illustrates a case in which the CEP engine 30 informs the client 25 of matches with the condition A, . . . , the condition A×B×C, and the client 25 informs the client 26 of a match with the condition A×B×C. The client 25 may transfer all pieces of information from the server apparatus 21 to the client 26.

The client 25 determines whether the result of the filtering informed from the server apparatus 21 is appropriate or inappropriate and informs the server apparatus 21 of the determination result. The client 26 too determines whether the result of the filtering transferred from the client 25 is appropriate or inappropriate and informs the server apparatus 21 of the determination result.

The server apparatus 21 stores therein the cumulative counting number tables 41b separately for the clients 25 and 26, and cumulatively counts the numbers of times determined to be appropriate and inappropriate for each filtering condition separately for the clients 25 and 26. The server apparatus 21 stores therein a switching condition for each filtering condition. When the cumulative values of the numbers of times determined to be appropriate and inappropriate at the client 25 match a switching condition for invalidating a filtering condition, the server apparatus 21 switches the filtering condition that matches the switching condition to be invalid. The server apparatus 21 integrates a plurality of filtering conditions to generate a new filtering condition. The example of FIG. 16 illustrates a case in which the conditions A and B are integrated to form the condition A×B, and further, the conditions A, B, and C are integrated to form the condition A×B×C. When the cumulative value of the number of times determined to be appropriate at the client 26 matches a switching condition for validating a filtering condition, the server apparatus 21 outputs the result of the filtering under the filtering condition that matches the switching condition to the client 26. The example of FIG. 16 illustrates a case in which the match with the condition A×B×C is informed also to the client 26, because the switching condition for validating the condition A×B×C is matched.

Figure 17:
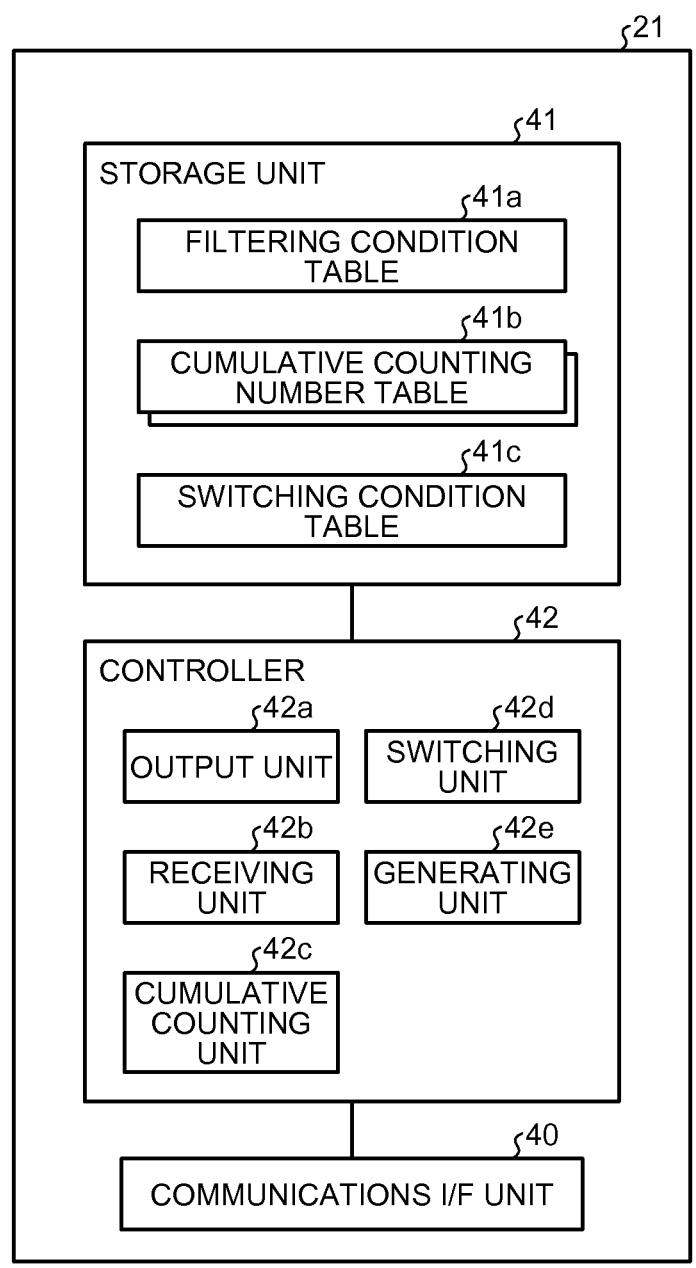
FIG. 17 is a diagram illustrating an example of the schematic configuration of a CEP system according to the fourth embodiment.

FIG. 17 is a diagram illustrating an example of the schematic configuration of a CEP system according to the fourth embodiment. When new data different from the former one is input, the generating unit 42e generates a new filtering condition that makes the new data subjected to filtering, and adds it to the filtering condition table 41a. For example, when the weather information 24 with a forecast of rain is newly input, the generating unit 42e generates a new filtering condition that makes the weather information with a forecast of rain a filtering condition, and adds it to the filtering condition table 41a. When speed information with a speed of 40 [Km/h] is newly input, the generating unit 42e generates a new filtering condition that makes the speed information with a speed of 40 [Km/h] a filtering condition, and adds it to the filtering condition table 41a. When wiper information indicating that wipers are working is input, the generating unit 42e generates a new filtering condition that makes the wiper information indicating that wipers are working a filtering condition, and adds it to the filtering condition table 41a. FIG. 18 is a diagram illustrating an example of the filtering condition table. In the filtering condition table 41a illustrated in FIG. 18, a forecast of rain is added as a filtering condition of the condition A, a speed of 40 [Km/h] is added as a filtering condition of the condition B, and operation of wipers is registered as a filtering condition of the condition C. In the present embodiment, the items "condition" and "invalidation condition" are set separately for the clients 25 and 26 in the filtering condition table 41a to separately store whether the filtering condition and the invalidation condition are valid. When adding a new filtering condition, the generating unit 42e adds it with both the filtering condition and the invalidation condition set valid for the clients 25 and 26.

When a switching condition for switching a filtering condition to be invalid is matched, the generating unit 42e generates a new filtering condition from the filtering condition and the filtering condition that has already been invalid. For example, when the condition B has already been invalid and the condition A is switched to be invalid, the generating unit 42e generates a condition A×B that is the logical product of the condition A and the condition B, and adds it to the filtering condition table 41a. When the conditions A and B have already been invalid and the condition C is switched to be invalid, the generating unit 42e generates a condition A×C that is the logical product of the condition A and the condition C, and a condition B×C that is the logical product of the condition B and the condition C, and adds them to the filtering condition table 41a. When the condition C has already been invalid and the condition A×B is switched to be invalid, the generating unit 42e generates a condition A×B×C that is the logical product of the condition C and the condition A×B, and adds it to the filtering condition table 41a. The filtering condition table 41a illustrated in FIG. 18 stores therein filtering conditions of the added condition A×B, condition A×C, condition B×C, and condition A×B×C.

The generating unit 42e also generates a new switching condition for switching a filtering condition newly added to the filtering condition table 41a between being valid and invalid, and adds it to the filtering condition table 41a. For example, for a new filtering condition, the generating unit 42e adds a new switching condition with the invalidation condition and the invalidation cancellation condition set to predetermined values. In the present embodiment, for the new filtering condition, the generating unit 42e adds the invalidation condition being 5 and the invalidation cancellation condition being such that the number of times of success is 10 or more as a new switching condition. The generating unit 42e may generate a switching condition for the new filtering condition from the switching condition of the original filtering conditions before integration. FIG. 19 is a diagram illustrating an example of the switching condition table. The switching condition table 41c illustrated in FIG. 19 stores therein a switching condition that includes, for the conditions A to C, condition A×B, condition A×C, condition B×C, and condition A×B×C, the invalidation condition being 5 and the invalidation cancellation condition being such that the number of times of success is 10 or more.

Figures 20, 21:
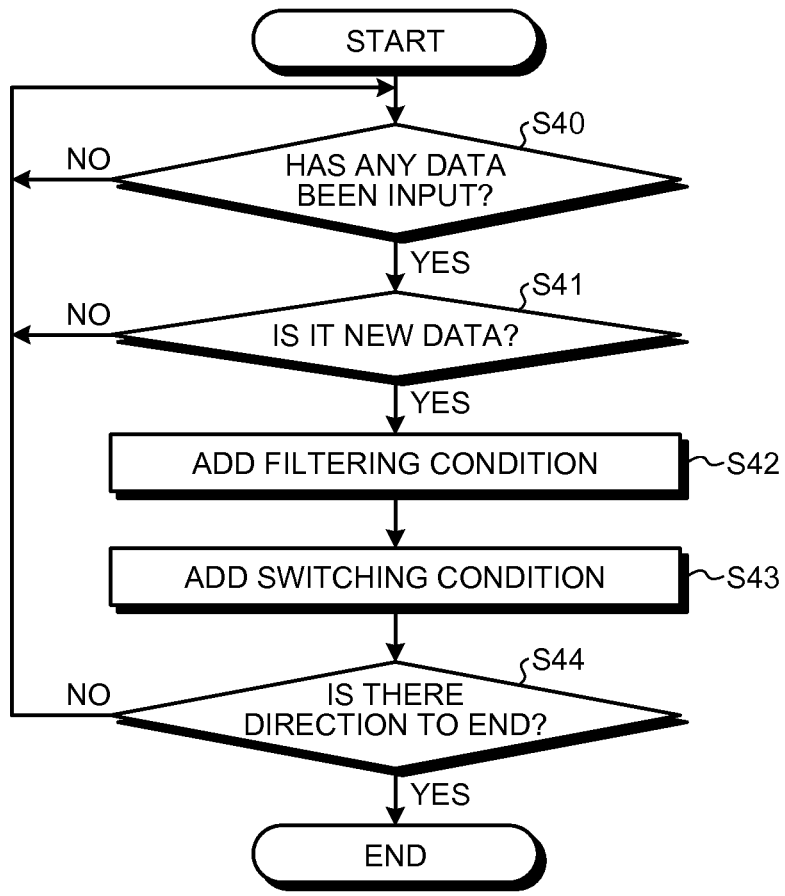
FIG. 20 is a diagram illustrating an example of a cumulative counting number table that stores therein the numbers of times a result of filtering is determined to be appropriate and inappropriate by a client 26.
FIG. 21 is a flowchart illustrating the procedure of addition processing.

The receiving unit 42b receives a determination result about whether the result of the filtering is appropriate or inappropriate from the clients 25 and 26. Separately for the clients 25 and 26, based on the received determination result, the cumulative counting unit 42c adds the numbers of times determined to be appropriate and inappropriate to the number of times of success and the number of times of failure in the cumulative counting number table 41b. FIG. 20 is a diagram illustrating an example of a cumulative counting number table that stores therein the numbers of times determined to be appropriate and inappropriate by the client 26. The example of FIG. 20 illustrates that the condition A×B×C includes the number of times of success being 10 and the number of times of failure being 1.

The switching unit 42d switches each filtering condition between being valid and invalid separately for the clients 25 and 26. For example, separately for the clients 25 and 26, for each filtering condition whose invalidation condition is valid, the switching unit 42d determines whether the number of times of success in the cumulative counting number table 41b matches the number of times specified as the invalidation cancellation condition in the switching condition table 41c. For a filtering condition whose number of times of success matches the number of times specified as the invalidation cancellation condition, the switching unit 42d updates the item "invalidation condition" in the filtering condition table 41a to be "invalid" and cancels the invalidation condition. For example, a case is assumed in which the cumulative counting number table 41b for the client 26 is as illustrated in FIG. 20, and the switching condition table 41c is as illustrated in FIG. 19. In this case, because the value of the number of times of success with the condition A×B×C matches the number of times specified as the invalidation cancellation condition, the switching unit 42d, as illustrated in FIG. 18, updates the item "invalidation condition" of the client 26 of the condition A×B×C to be "invalid" and cancels the invalidation condition.

Separately for the clients 25 and 26, for each filtering condition whose invalidation condition is valid, the switching unit 42d determines whether the number of times of failure in the cumulative counting number table 41b matches the number of times specified as the invalidation condition in the switching condition table 41c. For any filtering condition whose number of times of failure matches the number of times specified as the invalidation condition, the switching unit 42d updates the item "status" in the filtering condition table 41a to be "invalid" and invalidates the filtering condition.

When the speed information 23 or the weather information 24 has been received, for the client 25, the output unit 42a performs filtering on the input data under each filtering condition whose status in the filtering condition table 41a is valid, and informs whether there is any match with any filtering condition. For the client 26, the output unit 42a performs filtering on the input data under each filtering condition whose invalidation condition in the filtering condition table 41a is invalid, and informs whether there is any match with any filtering condition. In other words, for each filtering condition whose invalidation condition is invalid, the output unit 42a informs the client 26 directly of the result of the filtering.

Next, explained will be the flow of addition processing in which the server apparatus 21 according to the present embodiment adds a filtering condition when new data different from the former one is input. FIG. 21 is a flowchart illustrating the procedure of the addition processing. This addition processing is performed, for example, when the server apparatus 21 is directed to start data filtering.

As illustrated in FIG. 21, the generating unit 42e determines whether any of the speed information 23, the weather information 24, and the wiper information has been received (S40). When none of the speed information 23, the weather information 24, and the wiper information has been received (No at S40), the flow moves to S40 to wait for data reception. When any of the speed information 23, the weather information 24, and the wiper information has been received (Yes at S40), the generating unit 42e determines whether any new data different from the former one has been input (S41). When any new data different from the former one has been input (Yes at S41), the generating unit 42e generates a new filtering condition that makes the new data subjected to filtering, and adds it to the filtering condition table 41a (S42). For the added new filtering condition, the generating unit 42e adds the invalidation condition being 5 and the invalidation cancellation condition being such that the number of times of success is 10 or more as a new switching condition (S43). When no new data has been input (No at S41), the flow moves to S40 to wait for data reception.

The generating unit 42e determines whether the end of processing has been directed from a processing unit (not illustrated) that controls complex event processing (S44). When the end of processing has been directed (Yes at S44), the generating unit 42e ends the processing. When the end of processing has not been directed (No at S44), the flow moves to S40.

Figure 22:
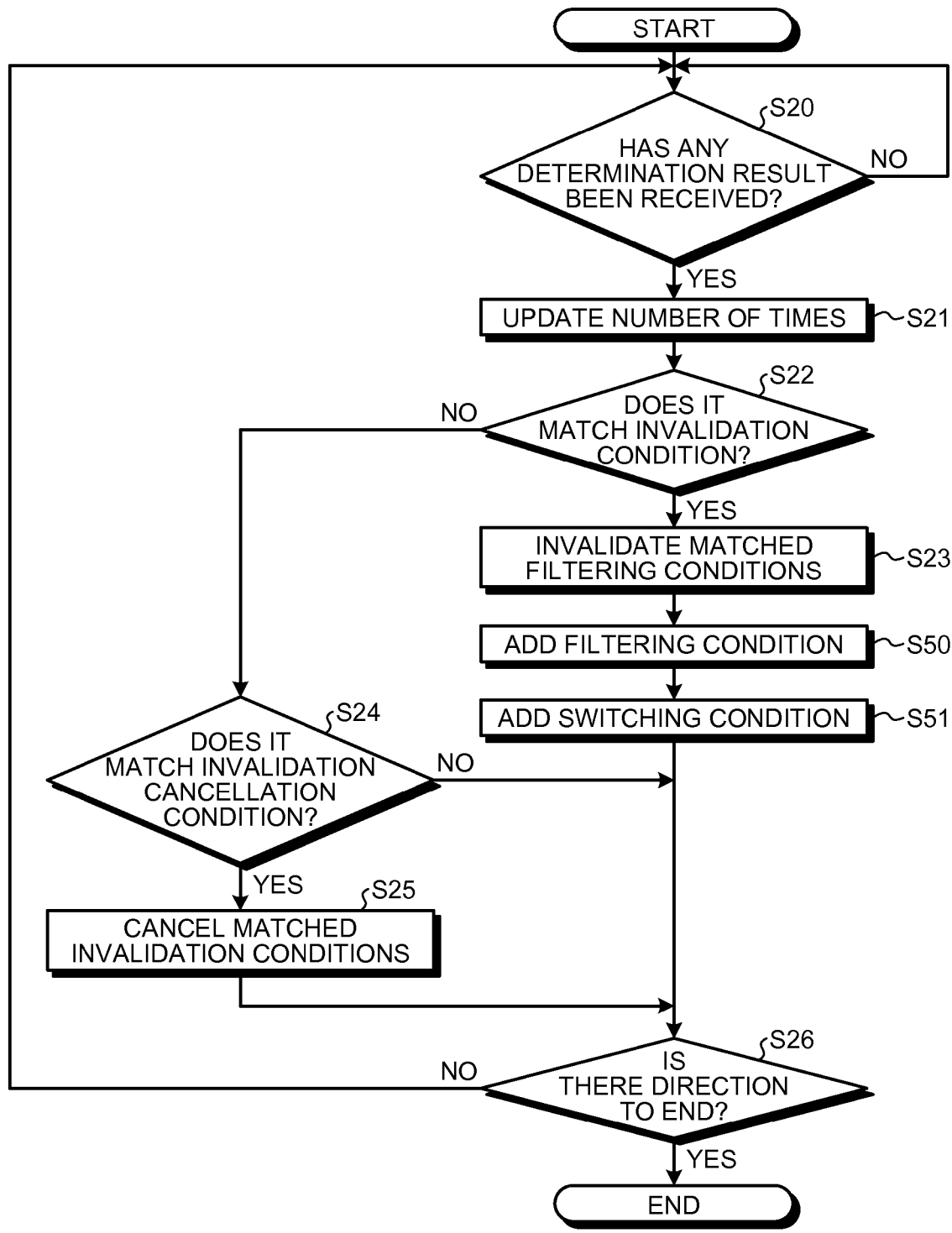
FIG. 22 is a flowchart illustrating the procedure of the switching processing.
Figure 23:
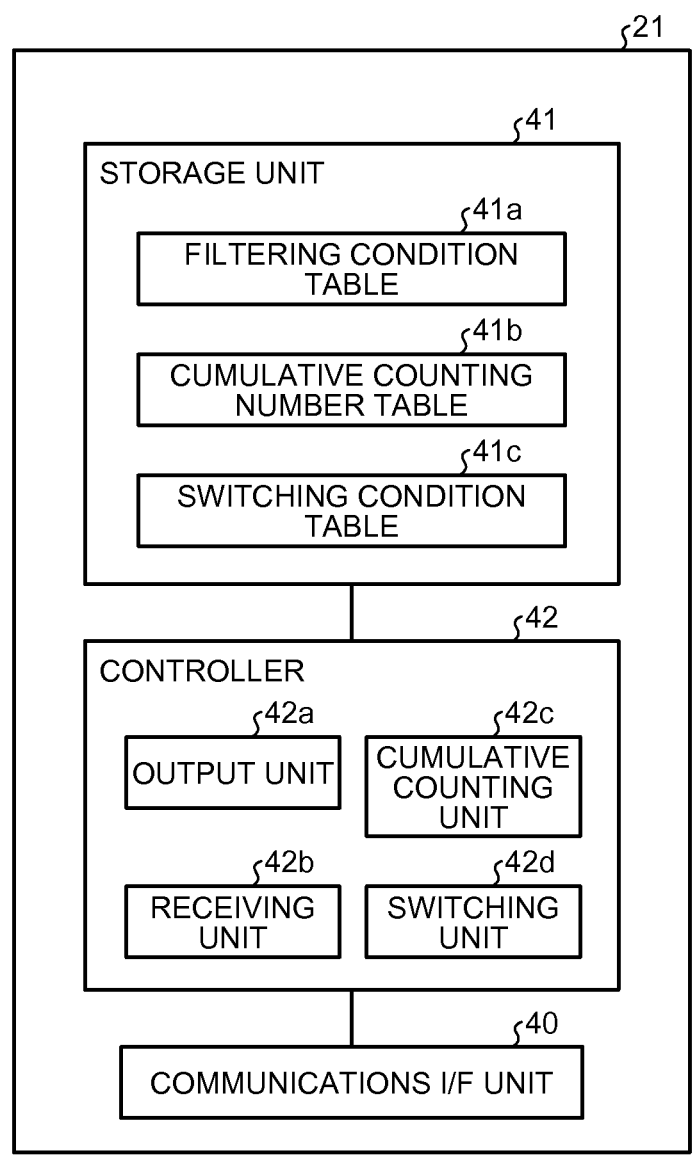
FIG. 23 is a diagram illustrating an example of the functional configuration of a server apparatus according to a fifth embodiment.

Next, explained will be the flow of switching processing by which the server apparatus 21 according to the present embodiment switches a filtering condition for the client 26 between being valid and invalid based on the determination result received from the client 26. FIG. 22 is a flowchart illustrating the procedure of the switching processing. The same processing part as the switching processing according to the second embodiment illustrated in FIG. 8 will be referred to by the same reference numerals and the explanation thereof will be omitted.

As illustrated in FIG. 22, the generating unit 42e generates a new filtering condition that is the logical product of a filtering condition whose number of times of failure matches the number of times specified as the invalidation condition and the filtering condition that has already been invalid, and adds it to the filtering condition table 41a (S50). For the added new filtering condition, the generating unit 42e adds the invalidation condition being 5 and the invalidation cancellation condition being such that the number of times of success is 10 or more as a new switching condition (S51).

As described above, when data different from the former one is input, the server apparatus 21 generates a new filtering condition that makes the different data subjected to filtering and a new switching condition for switching the filtering condition between being valid and invalid. When the new switching condition for invalidating the new filtering condition is matched, the server apparatus 21 generates a further new filtering condition from the new filtering condition and the filtering condition that has already been invalid. The server apparatus 21 generates a further new switching condition for switching the further new filtering condition between being valid and invalid. This allows the server apparatus 21 to automatically generate a filtering condition from input data. This also allows the server apparatus 21 to automatically generate a filtering condition that allows effective data to be extracted for the client 25 by combining filtering conditions.

The server apparatus 21 receives information indicating whether the result is appropriate or inappropriate from the client 26 to which the client 25 transferred the result. Separately for the clients 25 and 26, for each filtering condition, the server apparatus 21 cumulatively counts the numbers of times the result is determined to be appropriate and inappropriate. When the cumulative value of the number of times the result is determined to be appropriate by the client 26 matches a switching condition for validating a filtering condition, the server apparatus 21 outputs the result of the filtering under the filtering condition that matches the switching condition to the client 26. This allows the server apparatus 21 to extract and transmit effective data for the client 26.

[e] Fifth Embodiment

A fifth embodiment will be explained. The fifth embodiment describes a case in which the occurrence of the congestion of motorcycles is predicted using filtering conditions under which the occurrence of the congestion of vehicles is predicted. The configuration of a CEP system according to the fifth embodiment is nearly the same as that of the above second embodiment. Different parts will be mainly explained.

Because the functional configuration of a sever apparatus according to the fifth embodiment is nearly the same as that of the server apparatus according to the second embodiment illustrated in FIG. 3, different parts will be mainly explained. The storage unit 41 stores therein the filtering condition table 41a used for the prediction of the occurrence of the congestion of vehicles. The filtering condition table 41a stores therein the filtering conditions used for the prediction of the occurrence of the congestion of vehicles and their being valid or invalid for filtering for each of the filtering conditions. The filtering condition table 41a is generated, for example, by duplicating the filtering condition table used for the prediction of the occurrence of the congestion of vehicles. The storage unit 41 stores therein the switching condition table 41c that stores therein an invalidation condition and a cancellation condition for each filtering condition. The invalidation condition and the cancellation condition in the switching condition table 41c may be ones used for the prediction of the occurrence of the congestion of vehicles or may be newly set by an administrator or the like. Distributed to the server apparatus 21 is the speed information 23 that indicates, instead of the speed of vehicles, the speed of motorcycles detected by speed sensors provided at predetermined positions on a road subjected to traffic condition monitoring.

FIG. 24 is a diagram illustrating an example of the functional configuration of the filtering condition table. As illustrated in FIG. 24, the filtering condition table 41a stores therein conditions used for the prediction of the occurrence of the congestion of vehicles as the item "filtering condition" and their being valid or invalid for the prediction of the occurrence of the congestion of vehicles as the item "status". In the example of FIG. 24, because the conditions A and B include the status being valid and the invalidation condition being invalid, they are effective filtering conditions for the prediction of the occurrence of the congestion of vehicles. Because the condition C includes the status being invalid, it is an ineffective filtering condition for the prediction of the occurrence of the congestion of vehicles.

When the speed information 23 or the weather information 24 has been received, the output unit 42a performs filtering on the input data under each filtering condition whose status stored in the filtering condition table 41a is valid. When the input data matches any of the filtering conditions, the output unit 42a informs the traffic control server 22 of which filtering condition is matched.

When receiving information from the server apparatus 21, the traffic control server 22, predicting the occurrence of congestion in the road subjected to traffic condition monitoring, performs control to relieve the congestion. The traffic control server 22 determines whether the result of the filtering informed from the server apparatus 21 is appropriate or inappropriate based on whether congestion has occurred in the road subjected to monitoring and informs the server apparatus 21 of the determination result.

The receiving unit 42b receives, from the traffic control server 22, a determination result about whether the result of the filtering is appropriate or inappropriate. For each filtering condition whose invalidation condition is valid, based on the determination result received by the receiving unit 42b, the cumulative counting unit 42c adds the numbers of times the result of the filtering determined to be appropriate and inappropriate to the number of times of success and the number of times of failure in the cumulative counting number table 41b.

For each filtering condition whose invalidation condition is valid, the switching unit 42d determines whether the number of times of success in the cumulative counting number table 41b matches the number of times specified as the invalidation cancellation condition in the switching condition table 41c. For any filtering condition whose number of times of success matches the number of times specified as the invalidation cancellation condition, the switching unit 42d updates the item "invalidation condition" in the filtering condition table 41a to be "invalid" and cancels the invalidation condition.

When any filtering condition that is valid for the prediction of the occurrence of the congestion of vehicles is invalidated, the switching unit 42d switches any filtering condition that is invalid in the filtering on the speed information of vehicles to be valid. For example, when the statuses of the condition A and the condition B in the filtering condition table 41a illustrated in FIG. 24 are invalidated, the switching unit 42d updates the status of the condition C to be valid and switches the filtering condition of the condition C to be valid.

Figure 25:
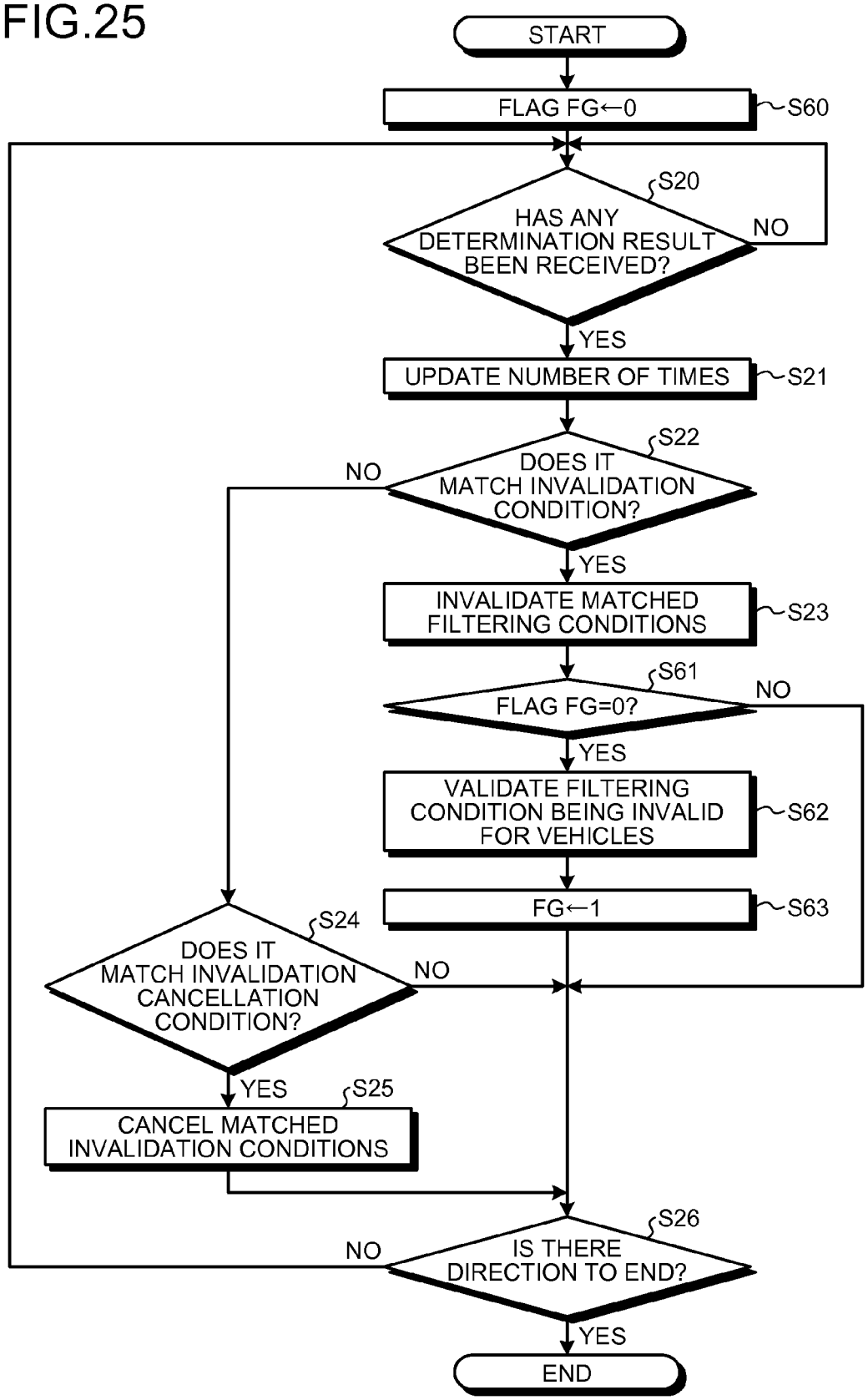
FIG. 25 is a flowchart illustrating the procedure of the switching processing.

Next, the flow of switching processing according to the present embodiment will be explained. FIG. 25 is a flowchart illustrating the procedure of the switching processing. The same processing part as the switching processing according to the second embodiment illustrated in FIG. 8 will be referred to by the same reference numerals and the explanation thereof will be omitted.

As illustrated in FIG. 25, when the switching processing is started, the switching unit 42d initializes a flag FG to be 0 (S60).

After updating the status of any filtering condition whose number of times of failure matches the number of times specified as invalidation condition (S23), the switching unit 42d determines whether the value of the flag FG is 0 (S61). When the value of the flag FG is 0 (Yes at S61), the switching unit 42d updates the status of any filtering condition that is invalid for the prediction of the occurrence of the congestion of vehicles to be valid (S62). The switching unit 42d then updates the value of the flag FG to be 1 (S63), and the flow moves to S26. When the value of the flag FG is not 0 (No at S61), the flow moves to S26.

In other words, the switching unit 42d updates the status of the filtering condition that is invalid for the prediction of the occurrence of the congestion of vehicles to be valid, when first updating the status of any filtering condition that is valid for the prediction of the occurrence of the congestion of vehicles to be invalid. This allows the server apparatus 21 to perform filtering under the condition C that is invalid for the prediction of the occurrence of the congestion of vehicles. Although in the present embodiment the filtering condition that is invalid for the prediction of the occurrence of the congestion of vehicles is validated at the timing at which the filtering condition that is valid for the prediction of the occurrence of the congestion of vehicles is first invalidated, the filtering condition may be validated at different timing. For example, the filtering condition that is invalid for the prediction of the occurrence of the congestion of vehicles may be validated at the timing at which a specific filtering condition is invalidated. The filtering condition that is invalid for the prediction of the occurrence of the congestion of vehicles may be validated at the timing at which all filtering conditions that are valid for the prediction of the occurrence of the congestion of vehicles are invalidated.

As described above, the server apparatus 21 stores therein, for each filtering condition, its being valid or invalid for the prediction of the occurrence of the congestion of vehicles. When performing the prediction of the occurrence of the congestion of motorcycles that is similar to the prediction of the occurrence of the congestion of vehicles, the server apparatus 21 performs filtering on the data input under any filtering condition that is valid for the prediction of the occurrence of the congestion of vehicles, and outputs the result of the filtering to the traffic control server 22. The server apparatus 21 receives, from the traffic control server 22, information indicating whether the output result of the filtering is appropriate or inappropriate. Based on the information received from the traffic control server 22, the server apparatus 21 cumulatively counts the numbers of times determined to be appropriate and inappropriate for each valid filtering condition. When the cumulative value of the number of times determined to be inappropriate matches the switching condition for invalidating the filtering condition, the server apparatus 21 switches the filtering condition to be invalid and switches the filtering condition that has been invalid for the prediction of the occurrence of the congestion of vehicles to be valid. This allows the server apparatus 21 to perform filtering using the filtering condition that is invalid for the prediction of the occurrence of the congestion of vehicles, even when the filtering condition that is valid for the prediction of the occurrence of the congestion of vehicles has no effect on the prediction of the occurrence of the congestion of motorcycles. This allows the server apparatus 21 to determine a filtering condition that is invalid for the prediction of the occurrence of the congestion of vehicles, but valid for the prediction of the occurrence of the congestion of motorcycles, thereby extracting data effective for the prediction of the occurrence of the congestion of motorcycles. In other words, the server apparatus 21 can determine a filtering condition that is invalid for filtering on data of a predetermined type, but valid for filtering on data of a type similar to the predetermined type, and can extract effective data for the output destination from the data of the similar type.

[f] Sixth Embodiment

Although the embodiments of the disclosed apparatus have been so far explained, the disclosed technique may be embodied in various different manners apart from the above embodiments. Hereinafter, other embodiments included in the present invention will be explained.

For example, although the above second to fifth embodiments explain the cases in which data is stored separately in a plurality of tables such as the filtering condition table 41a, the cumulative counting number table 41b, and the switching condition table 41c, the disclosed apparatus is not limited thereto. For example, data may be appropriately integrated or divided. For example, data in the filtering condition table 41a, the cumulative counting number table 41b, and the switching condition table 41c may be stored in a single table. FIG. 26 is a diagram illustrating an example of a data configuration when all pieces of data are stored in a single table.

Although the above second to fifth embodiments explain the cases in which the filtering condition being valid or invalid is stored in the item "status" and the invalidation condition being valid or invalid is stored in the item "invalidation condition" in the filtering condition table 41a, the disclosed apparatus is not limited thereto. For example, without the filtering condition and the invalidation condition stored as being valid or invalid, whether the filtering condition is valid or invalid may be determined by whether the number of times of failure matches the invalidation condition, whereas whether the invalidation condition is valid or invalid may be determined by whether the number of times of success matches the invalidation cancellation condition.

The above second to fifth embodiments explain the cases in which, in the switching processing, whether the number of times of failure matches the invalidation condition is determined first, and when the number of times of failure does not match the invalidation condition, whether the number of times of success matches the invalidation cancellation condition is then determined. The disclosed apparatus is not limited thereto. For example, whether the number of times of success matches the invalidation cancellation condition may be determined first, and when the number of times of success does not match the invalidation cancellation condition, whether the number of times of failure matches the invalidation condition may be determined.

Although the above third and fourth embodiments explain the cases in which a plurality of filtering conditions are integrated as a logical product to generate a new filtering condition, the disclosed apparatus is not limited thereto. For example, the filtering conditions may be integrated as a combination of various logical operations including a logical product, a logical sum, and an exclusive condition to generate a new filtering condition. For example, when the filtering conditions are integrated, they may be integrated as the logical product of the exclusive condition on part of the filtering conditions and the rest of the filtering conditions to generate a new filtering condition. A new filtering condition may be the exclusive logical sum of the filtering conditions.

The components of the illustrated apparatuses are functionally conceptual and are not necessarily physically configured as illustrated. In other words, the specific condition of the dispersion and integration of the apparatuses is not limited to the illustrated ones, and the whole or part thereof may be dispersed or integrated functionally or physically on an optional basis to be configured in accordance with various loads, usage conditions, or the like. For example, the processing units illustrated in FIG. 1, that is, the output unit 13, the receiving unit 14, the cumulative counting unit 15, and the switching unit 16 may be appropriately integrated. For example, the processing units illustrated in FIGS. 3, 9, 17, and 23, that is, the output unit 42a, the receiving unit 42b, the cumulative counting unit 42c, the switching unit 42d, and the generating unit 42e may be appropriately integrated. The whole or part of the processing functions performed by the processing units may be achieved by a CPU and any program that is analyzed and executed by the CPU or may be achieved by wired-logic hardware.

Filtering Program

The various pieces of processing explained in the above embodiments may be achieved also by executing programs prepared in advance on a computer system such as a personal computer or a workstation. Hereinafter, explained will be an example of the computer system that executes any program having the same functions as those of the above embodiments. FIG. 27 is a diagram illustrating a computer that executes a filtering program.

As illustrated in FIG. 27, a computer 300 includes a central processing unit (CPU) 310, a read only memory (ROM) 320, a hard disk drive (HDD) 330, and a random access memory (RAM) 340. These units 310 to 340 are connected with each other via a bus 400.

The ROM 320 stores therein in advance a filtering program 320a that exhibits the same functions as those of the processing units of the above first to fifth embodiments. For example, the filtering program 320a is stored that exhibits the same functions as those of the output unit 13, the receiving unit 14, the cumulative counting unit 15, and the switching unit 16 in the above first embodiment. For example, the filtering program 320a is stored that exhibits the same functions as those of the output unit 42a, the receiving unit 42b, the cumulative counting unit 42c, the switching unit 42d, and the generating unit 42e in the above second to fifth embodiments. The filtering program 320a may be appropriately separated.

The HDD 330 stores therein in advance various types of data that are needed to execute a program. For example, the storage unit 41 stores therein filtering conditions, switching conditions, and integration conditions.

The CPU 310 reads the filtering program 320a from the ROM 320 and executes it, thereby performing the same operations as those of the processing units in the first to fifth embodiments. In other words, the filtering program 320a performs the same operations as those of the output unit 13, the receiving unit 14, the cumulative counting unit 15, and the switching unit 16 in the first embodiment. Alternatively, the filtering program 320a performs the same operations as those of the output unit 42a, the receiving unit 42b, the cumulative counting unit 42c, the switching unit 42d, and the generating unit 42e in the above second to fifth embodiments.

The above filtering program 320a is not necessarily needed to be stored in the ROM 320 from the beginning. The filtering program 320a may be stored in the HDD 330.

For example, the program may be stored in portable physical media such as a flexible disk (FD), a CD-ROM, a DVD disk, a magneto-optical disk, and an IC card to be inserted into the computer 300, and the computer 300 may read the program from these and execute it.

Furthermore, the program may be stored in another computer (or server) connected to the computer 300 via a public network, the Internet, a LAN, a WAN, or the like, and the computer 300 may read the program from these and execute it.

An embodiment allows effective data for an output destination to be extracted.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A server apparatus, comprising:
an interface that is connectable to a network and to receive speed information indicating speed of vehicles detected by speed sensors provided at predetermined positions on a road subjected to monitoring and weather information indicating predicted weather in an area including the road subjected to monitoring, the speed information and the weather information being distributed through the network;
a storage unit that stores a plurality of filtering conditions in association with one of statuses of being valid and invalid, and a switching condition which defines a number of times the filtering condition is determined as inappropriate at which the status of the filtering condition is switched from being valid to invalid; and
a controller coupled to the storage unit, that performs a process comprising:
performing complex event processing by filtering the received speed information and the weather information for each filtering condition whose status stored in the storage unit is valid and outputting a result of the filtering to a traffic control server connected to the server apparatus via a network;
receiving, from the traffic control server, information indicating whether the result of the filtering output in the outputting is appropriate or inappropriate, the traffic control server sending information indicating that the result of the filtering output is appropriate on determining that a congestion has occurred, and sending information indicating that the result of the filtering output is inappropriate on determining that the congestion has not occurred;
cumulatively counting the numbers of times the output result of the filtering has been determined to be appropriate and inappropriate for each filtering condition based on the information received in the receiving; and
switching the status of the filtering condition stored in the storage unit between valid and invalid based on cumulative values of the numbers of times the output result of the filtering has been determined to be appropriate and inappropriate and the switching condition.

2. The server apparatus according to claim 1, wherein the switching invalidates a filtering condition when an invalidation condition that invalidates the filtering condition has been met earlier than a cancellation condition that cancels the invalidation condition and cancels the invalidation condition when the cancellation condition has been met earlier than the invalidation condition.

3. The server apparatus according to claim 1, wherein the process further comprises generating a new filtering condition from a plurality of filtering conditions.

4. The server apparatus according to claim 3, wherein the generating, when any data different from data previously received has been received by the interface, generates a new filtering condition that makes the received different data subjected to filtering and a new switching condition that switches the filtering condition between being valid and invalid, and when the new switching condition through which the new filtering condition is switched to be invalid is met, generates a further new filtering condition and a further new switching condition that switches the filtering condition between being valid and invalid from the new filtering condition and the filtering condition that is invalid.

5. The server apparatus according to claim 1, wherein
the receiving receives information from a transfer destination to which the traffic control server transferred the result, the information indicating whether the result of the filtering is appropriate or inappropriate,
the cumulatively counting, for the traffic control server and the transfer destination separately, for each filtering condition, cumulatively counts the numbers of times the result of filtering has been determined to be appropriate and inappropriate, and
the outputting, when the cumulative value of the number of times the result of filtering has been determined to be appropriate by the transfer destination matches a number defined by a switching condition that validates the filtering condition, outputs, to the transfer destination, the result of the filtering through the filtering condition whose cumulative value matches the number defined by the switching condition.

6. The server apparatus according to claim 1, wherein
the storage unit stores whether each filtering condition is valid or invalid for the filtering on a predetermined type of data,
the performing, when performing the filtering on data of a type similar to the predetermined type, performs the filtering on the data through filtering conditions that are stored as valid in the storage unit, and outputs a result of the filtering to the traffic control server,
the receiving receives information indicating whether the result of the filtering is appropriate or inappropriate, from the traffic control server,
the cumulatively counting cumulatively counts the numbers of times the result of filtering is determined to be appropriate and inappropriate for each of the valid filtering conditions based on the information received from the traffic control server, and
the switching, when the cumulative value of the number of times the result of filtering is determined to be inappropriate with respect to the valid filtering condition matches a number defined by a switching condition that invalidates the filtering condition, switches the status of the filtering condition to being invalid and switches the status of a filtering condition whose status stored in the storage unit corresponding to the filtering on the data of the predetermined type to being valid.

7. A filtering method comprising:
receiving, via an interface connected to a network, speed information indicating speed of vehicles detected by speed sensors provided at predetermined positions on a road subjected to monitoring and weather information indicating predicted weather in an area including the road subjected to monitoring, the speed information and the weather information being distributed through the network;
performing, using a controller, complex event processing by filtering the received speed information and the weather information for each filtering condition whose status stored in a storage unit is valid and outputting a result of the filtering to a traffic control server connected to the server apparatus via a network, the storage unit storing a plurality of filtering conditions in association with one of statuses of being valid and invalid, and a switching condition which defines a number of times the filtering condition is determined as inappropriate at which the status of the filtering condition is switched from being valid to invalid;
receiving, from the traffic control server, using the controller, information indicating whether the output result of the filtering is appropriate or inappropriate, the traffic control server sending information indicating that the result of the filtering output is appropriate on determining that a congestion has occurred, and sending information indicating that the result of the filtering output is inappropriate on determining that the congestion has not occurred;
cumulatively counting, using the controller, the numbers of times the output result of the filtering has been determined to be appropriate and inappropriate for each filtering condition based on the received information; and
switching, using the controller, the status of the filtering condition stored in the storage unit between valid and invalid based on cumulative values of the numbers of times the output result of the filtering has been determined to be appropriate and inappropriate and the switching condition.

8. The filtering method according to claim 7, wherein the switching includes invalidating a filtering condition when an invalidation condition that invalidates the filtering condition has been met earlier than a cancellation condition that cancels the invalidation condition and cancelling the invalidation condition when the cancellation condition has been met earlier than the invalidation condition.

9. The filtering method according to claim 7, further comprising generating, using the controller, a new filtering condition from a plurality of filtering conditions.

10. The filtering method according to claim 9, wherein the generating includes:
when any data different from data previously received has been received by the interface, generating a new filtering condition that makes the received different data subjected to filtering and a new switching condition that switches the filtering condition between being valid and invalid, and
when the new switching condition through which the new filtering condition is switched to be invalid is met, generating a further new filtering condition and a further new switching condition that switches the filtering condition between being valid and invalid from the new filtering condition and the filtering condition that is invalid.

11. The filtering method according to claim 7, wherein
the receiving includes receiving information from a transfer destination to which the traffic control server transferred the result, the information indicating whether the result of the filtering is appropriate or inappropriate,
the cumulatively counting includes, for the traffic control server and the transfer destination separately, for each filtering condition, cumulatively counting the numbers of times the result of filtering has been determined to be appropriate and inappropriate, and
the outputting includes, when the cumulative value of the number of times the result of filtering has been determined to be appropriate by the transfer destination matches a number defined by a switching condition that validates the filtering condition, outputting, to the transfer destination, the result of the filtering through the filtering condition whose cumulative value matches the number defined by the switching condition.

12. The filtering method according to claim 7, wherein
the performing includes, when performing the filtering on data of a type similar to a predetermined type, performing the filtering on the data through filtering conditions that are stored as valid in the storage unit for the filtering on the predetermined type of data and outputting a result of the filtering to the traffic control server,
the receiving includes receiving information indicating whether the output result of the filtering is appropriate or inappropriate from the traffic control sever,
the cumulatively counting includes cumulatively counting the numbers of times the result of filtering is determined to be appropriate and inappropriate for each of the valid filtering conditions based on the information received from the traffic control server, and
the switching includes, when the cumulative value of the number of times the result of filtering is determined to be inappropriate with respect to the valid filtering condition matches a number defined by a switching condition that invalidates the filtering condition, switching the status of the filtering condition to being invalid and switches the status of a filtering condition whose status stored in the storage unit corresponding to the filtering on the data of the predetermined type to being valid.

13. A non-transitory computer-readable recording medium having stored therein a program for causing a computer to execute a process, the process comprising:
receiving, via an interface connected to a network, speed information indicating speed of vehicles detected by speed sensors provided at predetermined positions on a road subjected to monitoring and weather information indicating predicted weather in an area including the road subjected to monitoring, the speed information and the weather information being distributed through the network;
performing complex event processing by filtering the received speed information and the weather information for each filtering condition whose status stored in a storage unit is valid and outputting a result of the filtering to a traffic control server connected to the server apparatus via a network, the storage unit storing a plurality of filtering conditions in association with one of statuses of being valid and invalid, and a switching condition which defines a number of times the filtering condition is determined as inappropriate at which the status of the filtering condition is switched from being valid to invalid;
receiving, from the traffic control server, information indicating whether the output result of the filtering is appropriate or inappropriate from the traffic control server, which sends information indicating that the result of the filtering output is appropriate on determining that a congestion has occurred, and sending information indicating that the result of the filtering output is inappropriate on determining that the congestion has not occurred;
cumulatively counting the numbers of times the output result of the filtering has been determined to be appropriate and inappropriate for each filtering condition based on the received information; and
switching the status of the filtering condition stored in the storage unit between valid and invalid based on cumulative values of the numbers of times the output result of the filtering has been determined to be appropriate and inappropriate and the switching condition.

14. The non-transitory computer-readable recording medium according to claim 13, wherein the switching includes invalidating a filtering condition when an invalidation condition that invalidates the filtering condition has been met earlier than a cancellation condition that cancels the invalidation condition and cancelling the invalidation condition when the cancellation condition has been met earlier than the invalidation condition.

15. The non-transitory computer-readable recording medium according to claim 13, wherein the process further comprises generating a new filtering condition from a plurality of filtering conditions.

16. The non-transitory computer-readable recording medium according to claim 15, wherein the generating includes:
when any data different from data previously received has been received by the interface, generating a new filtering condition that makes the received different data subjected to filtering and a new switching condition that switches the filtering condition between being valid and invalid, and
when the new switching condition through which the new filtering condition is switched to be invalid is met, generating a further new filtering condition and a further new switching condition that switches the filtering condition between being valid and invalid from the new filtering condition and the filtering condition that is invalid.

17. The non-transitory computer-readable recording medium according to claim 13, wherein
the receiving includes receiving information from a transfer destination to which the traffic control server transferred the result, the information indicating whether the result of the filtering is appropriate or inappropriate,
the cumulatively counting includes, for the traffic control server and the transfer destination separately, for each filtering condition, cumulatively counting the numbers of times the result of filtering has been determined to be appropriate and inappropriate, and
the outputting includes, when the cumulative value of the number of times the result of filtering has been determined to be appropriate by the transfer destination matches a number defined by a switching condition that validates the filtering condition, outputting, to the transfer destination, the result of the filtering through the filtering condition whose cumulative value matches the number defined by the switching condition.

18. The non-transitory computer-readable recording medium according to claim 13, wherein
the performing includes, when performing the filtering on data of a type similar to a predetermined type, performing the filtering on the data through filtering conditions that are stored as valid in the storage unit for the filtering on the predetermined type of data and outputting a result of the filtering to the traffic control server,
the receiving includes receiving information indicating whether the output result of the filtering is appropriate or inappropriate from the traffic control server,
the cumulatively counting includes cumulatively counting the numbers of times the result of filtering is determined to be appropriate and inappropriate for each of the valid filtering conditions based on the information received from the traffic control server, and
the switching includes, when the cumulative value of the number of times the result of filtering is determined to be inappropriate with respect to the valid filtering condition matches a number defined by a switching condition that invalidates the filtering condition, switching the status of the filtering condition to being invalid and switches the status of a filtering condition whose status stored in the storage unit corresponding to the filtering on the data of the predetermined type to being valid.

* * * * *